US012654273B2

(12) United States Patent
Inagaki et al.

(10) Patent No.: US 12,654,273 B2
(45) Date of Patent: Jun. 16, 2026

(54) QUALITY MANAGEMENT SYSTEM FOR MACHINING PROCESS, LUBRICATING LIQUID PROCESS, LUBRICATING LIQUID FOR MACHINE TOOL, AND ALKALINE ELECTROLYZED WATER GENERATION DEVICE FOR GENERATING LUBRICATING LIQUID

(71) Applicant: Plum & Peach, Ltd., Tokyo (JP)

(72) Inventors: Hidekazu Inagaki, Nishio (JP); Koji Hachisuka, Nishio (JP); Nobuyuki Shimizu, Takarazuka (JP); Koji Sato, Tokyo (JP)

(73) Assignee: Plum & Peach, Ltd., Tokyo (JP)

( * ) Notice: Subject to any disclaimer, the term of this patent is extended or adjusted under 35 U.S.C. 154(b) by 0 days.

(21) Appl. No.: 18/860,689

(22) PCT Filed: Apr. 28, 2023

(86) PCT No.: PCT/JP2023/016816
§ 371 (c)(1),
(2) Date: Dec. 1, 2024

(87) PCT Pub. No.: WO2023/210799
PCT Pub. Date: Nov. 2, 2023

(65) Prior Publication Data
US 2025/0312877 A1     Oct. 9, 2025

(30) Foreign Application Priority Data
Apr. 28, 2022   (JP) ................................. 2022-074639

(51) Int. Cl.
*B23Q 11/10*     (2006.01)
*C10M 173/02*     (2006.01)

(52) U.S. Cl.
CPC .......... *B23Q 11/10* (2013.01); *C10M 173/02* (2013.01)

(58) Field of Classification Search
CPC ........... C10N 2030/06; C10N 2040/14; C10N 2040/20; C10N 2040/22; C10M 173/02; C10M 2201/02; B23Q 11/00; B23Q 11/1061
See application file for complete search history.

(56) References Cited

FOREIGN PATENT DOCUMENTS

| | | | | |
|---|---|---|---|---|
| CN | 108342246 B | * | 10/2020 | .......... C10M 173/02 |
| CN | 213105869 U | | 5/2021 | |
| JP | 9-85577 A | | 3/1997 | |

(Continued)

*Primary Examiner* — Vishal V Vasisth
(74) *Attorney, Agent, or Firm* — NKL Law; Jae Youn Kim

(57) ABSTRACT

The present invention has an objective to provide a quality management system for a machining process that performs liquid management to secure and improve a machining performance (quality) of electrolytic water as a working liquid, a lubricating liquid for a machine tool, and an alkaline electrolytic water generation device for lubricating liquid generation. In the quality management system for a machining process of the present invention, in a machining process of a machine tool that uses a mixed liquid of a water-soluble lubricating stock liquid including alkaline electrolytic water and externally replenishable alkaline electrolytic water as a lubricating liquid, a quality of the lubricating liquid after mixing is monitored and managed by an electric conductivity.

13 Claims, 12 Drawing Sheets

(56) References Cited

FOREIGN PATENT DOCUMENTS

| | | | |
|----|-------------|----|---------|
| JP | 2001-105316 | A  | 4/2001  |
| JP | 2016-153461 | A  | 8/2016  |
| JP | 2019-2894   | A  | 1/2019  |
| WO | 2006/126248 | A1 | 11/2006 |
| WO | 2014155870  | A1 | 10/2014 |
| WO | 2015053192  | A1 | 4/2015  |

* cited by examiner

QUALITY MANAGEMENT SYSTEM FOR MACHINING PROCESS, LUBRICATING LIQUID PROCESS, LUBRICATING LIQUID FOR MACHINE TOOL, AND ALKALINE ELECTROLYZED WATER GENERATION DEVICE FOR GENERATING LUBRICATING LIQUID

This application is a 371 of PCT/JP2023/016816 filed Apr. 28, 2023.

TECHNICAL FIELD

The present invention relates to a quality management system for a machining process, a lubricating liquid for a machine tool, and a dedicated alkaline electrolytic water generation device suitable for the lubricating liquid that can eliminate the problems of oil-soluble lubricating liquids, while securing and improving a machining performance (quality) of electrolytic water as a working liquid.

BACKGROUND ART

Lubricating oil has been used as a wide variety of working liquids in machine tools used for machining metal materials. Conventionally, while an oil-soluble lubricant has been used for a lubricating oil as a working liquid, in recent years, a problem with this has been indicated. Specifically, in the case where an oil-soluble lubricant is used for a working liquid, while quality management such as machinability and a degree of degradation of the working liquid is performed by measuring a sugar content by pH or a refraction index of infrared light (Brix %), management of a working liquid by pH or concentration is difficult due to a reason such as cleaning of a measurement portion and calibration of a measurement value are frequently required in order to maintain the accuracy of a measurement device.

At the same time, a conventional oil-soluble lubricant is used by mixing with tap water, and is an environment in which bacteria can propagate. In an environment in which bacteria can survive, bacteria preferably eats phosphorus and sulfur included in the oil portion as food, and its excrement spoils the working liquid. Accordingly, an oil-soluble lubricant includes a wide variety of types of antiseptic agents. As a result of this, in a machining factory, liquid easily spoils in the summer, and at the same time workers may feel unwell, by the antiseptic agents making contact with their skin or being inhaled as a mist.

In this way, performing a periodical disposal process is reliable and inexpensive, in order to respond to the problems of securing a machining performance (quality) and spoiling of a working liquid. In contrast to this, when taking into consideration recent social demands such as reducing an environmental load, improving the work environment, and reducing a disposal amount after use for an oil-soluble lubricating liquid as a working liquid, are expected to be essential problems, and it is necessary to review the system for performing disposal that simply gives preference to securing of a machining performance (quality).

CITATION LIST

Patent Literature

Patent Literature 1: International Public tion No. WO 2015/053192
Patent Literature 2: International Publication No. WO 2014/155870

SUMMARY OF INVENTION

Technical Problem

From such problems, in recent years, various water-soluble working liquids have been developed, and further use expansion has been socially demanded (refer to Patent Literature 1 and 2). From among these, attention has been focused on using alkaline electrolytic water with a small environmental load as a working liquid, and the present inventors have performed development and provision of appropriate alkaline electrolytic water as a working liquid in various types of machining.

Moreover, conventionally, in the case where an oil-soluble liquid is used as a working liquid, or in the case where an operating liquid such as a sliding liquid with an oil-soluble component is mixed into alkaline electrolytic water as a working liquid, quality management such as machinability and a degree of degradation of the working liquid is performed by measuring a sugar content by pH or a refraction index of infrared light (Brix %). However, in the process in which the present inventors plan precise quality management of a working liquid (described below), management of a working liquid by a sugar content (Brix %) is difficult due to a reason such as frequently cleaning a measurement portion to remove so-called oils stains, for example, by cleaning for each machining in order to maintain the accuracy of a measurement device and performing calibration of measurement values is required, and in the case of alkaline electrolytic water, it has been found that pH cannot be set as an index of quality management of a working liquid (described below). The inventors, having obtained this knowledge, have an important development problem of how to precisely perform quality management in the case where alkaline electrolytic water is used as a working liquid.

In addition, in electrical discharging or water-jetting that can use pure water or industrial water as a working liquid, while disposal is given preference over quality management partly because working liquid disposal is easy and inexpensive, it is preferable for sufficient quality management to be performed that takes into consideration deterioration of machining accuracy due to inappropriate energization and influence or corruption due to the inclusion of abrasives or the like, it is necessary to improve the system of easily disposing working liquid just because it is pure water or industrial water, and thus the present inventors have taken into consideration that it is necessary to solve these development problems and perform precise liquid management using alkaline electrolytic water.

The present invention has been created based on knowledge obtained by the present inventors as a front runner in providing alkaline electrolytic water used for a lubricating liquid in light of the above, and has an objective to provide a quality management system for a machining process, a lubricating liquid for a machine tool, and an alkaline electrolytic water generation device for lubricating liquid generation that can eliminate the problems of oil-soluble lubricating liquids described above, while securing and improving a machining performance (quality) of electrolytic water as a working liquid.

Solution to Problem

First, a first present invention provides a quality management system for a machining process in the machining process of a machine tool in which a mixed liquid of a water-soluble lubricating stock liquid including alkaline electrolytic water and externally replenishable alkaline electrolytic water is used as a lubricating liquid, wherein the quality management system monitors and manages a quality of the lubricating liquid after mixing by an electric conductivity.

The present inventors of the present invention were unable to perform liquid management by monitoring a machining performance, in a lubricating liquid such as a working liquid of a machine tool that includes a conventional oil-soluble material as described below, and in the case where using alkaline electrolytic water instead, the present inventors have found that the machining performance has a positive correlation for electric conductivity (conduction rate), and the machine tool can be monitored in real time by setting the electric conductivity as an index. Based on this knowledge, in the quality management system for a machining process of the first present invention, a specific configuration is provided in which alkaline electrolytic water is adopted as a lubricating liquid of the machine tool, and in a flow path (portion nearest machining of the lubricating liquid discharged to a machining portion) after mixing a lubricating stock liquid (a water soluble polymer having a pH adjustment action is included) provided inside the machine tool and the alkaline electrolytic water, this electric conductivity is monitored and managed as an index, and the machining performance (quality) is secured and improved. Note that, there is also an advantage for the points of fine chips generated at the time of machining are easily separated from the working liquid and rust prevention is improved, as incidental effects of using alkaline electrolytic water for the working liquid.

Moreover, it is preferable for the electric conductivity monitored in the lubricating liquid after mixing to be corrected based on a preset correlation of a change in the electric conductivity with respect to an assumed metal ion concentration of the lubricating liquid by a prescribed eluted metal within the lubricating liquid in the machining process of the machine tool.

Specifically, the electric conductivity of the lubricating liquid of a mixed liquid and the metal ion concentration of a prescribed eluted metal are measured, an amount of change in the electric conductivity of the lubricating liquid by the prescribed eluted metal in the measured metal ion concentration is calculated, from the preset correlation of a change in the electric conductivity with respect to the metal ion concentration of the lubricating liquid by the prescribed eluted metal, and the calculated change amount of change in the electric conductivity is subtracted from the measured measurement value of the electric conductivity.

In the quality management system for a machining process, in the case where alkaline electrolytic water is used as a lubricating liquid such as a working liquid, while the lubricating liquid is monitored by setting the electric conductivity as an index from new knowledge such as the electric conductivity having a positive correlation with a machining performance, sludge (cutting chips of a tool, workpiece or the like) is actually eluted in the lubricating liquid during the machining process by a process of using the machine tool for a long time, and due to this, the electric conductivity of a metal ion concentration amount within the lubricating liquid changes (drifts), and it has been found that an accurate electric conductivity of alkaline electrolytic water cannot be detected.

Taking this fact into account, in a preferred present invention, a correction that removes an influence amount of metal ions from the electric conductivity of the measured lubricating liquid is performed, and the monitoring accuracy is improved by monitoring the lubricating liquid by the corrected electric conductivity. In particular, in the case of a lubricating liquid of alkaline electrolytic water in which waste liquid such as an oil-soluble lubricating liquid is not required, since it can be circulated and used for a long time, it is necessary to take into consideration an influence of a change in the metal ion concentration due to sludge, in the present invention, a correlation between the metal ion concentration and the electric conductivity (amount of change) of the lubricating liquid, in which eluted metal that can become sludge is included, is calculated and set beforehand, and based on this correlation, an amount of change in the electric conductivity corresponding to an actual measurement value of the metal ion concentration of the lubricating liquid is calculated, and a correction is performed to subtract this from the actual measurement value of the electric conductivity of the lubricating liquid. According to this correction, it becomes possible to perform appropriate monitoring of the electric conductivity by overcoming an influence due to sludge and setting a measurement value of the electric conductivity of the lubricating liquid as an index of machining performance management.

In a second present invention, it is provided that, as a lubricating liquid for a machine tool used in the quality management system for a machining process of the first present invention, the lubricating liquid for the machine tool having the alkaline electrolytic water as a main component and not including an oil-soluble material is preferable, in which the lubricating liquid does not contain an antiseptic agent and is blended with a pH buffer.

Moreover, it is preferable for a solute concentration of the lubricating liquid for the machine tool with the alkaline electrolytic water as a main component to be set as a practical management concentration within a preset range in accordance with the machine tool and the machining process for using the lubricating liquid.

As described above, in the case where alkaline electrolytic water is used as the lubricating liquid for the machine tool, there is an advantage for the point of obtaining an antiseptic effect by blending a pH buffer and performing a pH adjustment. On the other hand, since a correlation between quality of the liquid and a pH value disappears when a pH buffer is blended, it becomes difficult to use pH as an index of monitoring the lubricating liquid. In relation to this point, in alkaline electrolytic water dedicated for use as a lubricating oil, experimental results described below show that the solute concentration has a positive correlation with the electric conductivity within a prescribed range. Therefore, in the second present invention, dedicated alkaline electrolytic water is adopted as the lubricating liquid of the machine tool used in the quality management system for a machining process, and the alkaline electrolytic water is set within a range of a solubility concentration having a positive correlation with the electric conductivity as an index of monitoring the quality (machining performance) of the alkaline electrolytic water.

Moreover, the machine tool can include a working liquid storage tank for collecting and storing the lubricating liquid and supplying the lubricating liquid to the machine tool as a working liquid, the working liquid storage tank is supplied with the lubricating stock liquid from a lubricating stock liquid storage tank or a supply pipe connected to the lubricating stock liquid storage tank, and is supplied with the alkaline electrolytic water from an alkaline electrolytic water generation device, a storage tank of the alkaline electrolytic water generation device, or a supply pipe connected to the storage tank, and the electric conductivity of the mixed liquid within the working liquid storage tank can be monitored and managed. In the quality management system for a machining process, the following specific examples are provided, in which alkaline electrolytic water and a lubricating stock liquid are mixed, monitoring is performed by setting the electric conductivity as an index of liquid management, while performing pH adjustment at the time of mixing by setting this mixed liquid a desired working liquid in accordance with the machine tool and the machining conditions, preferable flow paths (including the working liquid storage tank) depending on various conditions and which flow paths to monitor are provided.

As a first specific example, the machine tool includes a mixing portion for mixing the lubricating stock liquid supplied from the lubricating stock liquid storage tank or the supply pipe connected to the lubricating stock liquid storage tank and the alkaline electrolytic water supplied from the alkaline electrolytic water generation device, the storage tank of the alkaline electrolytic water generation device, or the supply pipe connected to the storage tank, and a mixed liquid of the lubricating stock liquid and the alkaline electric lytic water by the mixing portion is supplied to the working liquid storage tank.

In the example of the quality management system for a machining process, the electric conductivity of a mixed liquid of the lubricating stock liquid and the alkaline electrolytic water within a working liquid storage tank such as a cutting liquid tank is monitored (at least measured). In particular, a "mixing portion" of the lubricating stock liquid and the alkaline electrolytic water is provided in a flow path to the working liquid storage tank, and it is preferably to perform monitoring of the working liquid in the flow path from the "mixing portion" onward. By providing this "mixing portion" and monitoring the working liquid within the "mixing portion", it can be determined beforehand whether or not it is alright to supply the mixed liquid from the lubricating stock liquid storage tank or the alkaline electrolytic water generation device to within the working liquid storage tank (cutting liquid tank or the like), and the electric conductivity of the working liquid within the working liquid storage tank can be prevented from suddenly changing.

Moreover, as another example of the quality management system for a machining process, the machine tool includes a mixing portion for mixing the lubricating stock liquid supplied from the lubricating stock liquid storage tank or the supply pipe connected to the lubricating stock liquid storage tank and the alkaline electrolytic water supplied from the alkaline electrolytic water generation device, the storage tank of the alkaline electrolytic water generation device, or the supply pipe connected to the storage tank, and a mixed liquid of the lubricating stock liquid and the alkaline electrolytic water within the mixing portion is supplied to within the machine tool from a supply pipe connected to the mixing portion, and the electric conductivity of the mixed liquid within the supply pipe or within the mixing portion is monitored and managed.

In another example of the quality management system for a machining process, the working liquid storage tank is not provided, the above described "mixing portion" of the lubricating stock liquid and the alkaline electrolytic water is provided in a machine tool that performs machining (misting for milling or the like) that does not recirculate the working liquid, and the electric conductivity is monitored "within a supply pipe" from the "mixing portion".

Moreover, in the quality management system for a machining process of the first present invention, an electric conductivity meter for monitoring and managing the electric conductivity can be included, and a necessary amount and a discharge amount per time of the lubricating stock liquid and/or the alkaline electrolytic water can be set in accordance with whether or not the electric conductivity of the mixed liquid of the alkaline electrolytic water and the lubricating stock liquid measured rom measurement information from the electric conductivity meter are within a preset range.

Moreover, in an example of the quality management system for a machining process, a necessary amount and a discharge amount (automatic drip amount) are controlled, by monitoring whether or not the monitored electric conductivity of the working liquid is within a set range and feedback thereof. As a result of this, an adjustment to a preferable electric conductivity can be performed in real time while performing monitoring of the working liquid, and it becomes possible to execute liquid management so as to maintain a machining performance in accordance with the content of machining.

Moreover, as another example of the quality management system for a machining process, there may be a plurality of the machine tools present, the lubricating stock liquid and the alkaline electrolytic water of each of the plurality of machine tools may be collectively supplied to one of the above described working liquid storage tank and the above described mixing portion, each of the plurality of machine tools may include an electric conductivity meter for measuring the electric conductivity of the collected mixed liquid within the working liquid storage tank or within the mixing portion in accordance with each of the machine tools, a wired or wireless external monitoring device may manage measured measurement information of each of the electric conductivity meters, determine whether or not the electric conductivity of the mixed liquid of the alkaline electrolytic water and the lubricating stock liquid is within a preset range in accordance with each of the machine tools, and set a necessary amount and an automatic drip amount per time of the lubricating stock liquid and/or the alkaline electrolytic water.

In yet another example of the quality management system for a machining process, one unified working liquid storage tank is provided with respect to the plurality of machine tools, and a control example is provided that performs monitoring and feedback for each of the machine tools within each of the machine tools. In this way, the plurality of machine tools can be convergently managed in terms of the working liquid, and in the case where the plurality of processors is introduced into a system that remotely controls machining in real time, for example, maintenance of this machining performance can be executed.

Moreover, lathing, milling, grinding, hole drilling, saw cutting, water-jetting, electric discharging, pressing, grinding, and polishing are exemplified as preferable machining examples executed by the machine tool.

Moreover, in the quality management system for a machining process, it is preferable for a metal ion concentration and at least one of a sugar content, a concentration, and a pH of the lubricating stock liquid, the alkaline electrolytic water, or the mixed liquid to be monitored and managed, in addition to monitoring and managing the electric conductivity of the mixed liquid of the lubricating stock liquid and the alkaline electrolytic water.

In addition, in the quality management system for a machining process, a water level of the mixed liquid within the working liquid storage tank may be monitored and managed in addition to monitoring and managing the electric conductivity of the mixed liquid of the lubricating stock liquid and the alkaline electrolytic water.

In the quality management system for a machining process of the first present invention, while a configuration is provided that uses alkaline electrolytic water is a working liquid to maintain a machining performance by the electric conductivity, multifaceted liquid management corresponding to various types of machining can be executed by combining with liquid management by the sugar content (Brix % measurement or the like), the concentration, or the pH performed by including conventional experimental rules, introduction into an existing liquid management system can be easily performed, and there is an advantage for the point of high marketability. Moreover, as a method of liquid amount management of a working Liquid when monitoring the electric conductivity of alkaline electrolytic water as a working liquid, for example, the extent that a total liquid amount of the working liquid in the entire present system reduces is detected by measuring, by a water level gauge or the like, a water level (liquid surface height) of the working liquid within the working liquid storage tank (cutting liquid tank 106 or the like).

In this way, if the volume of the working liquid storage tank is known, a dilution amount of the lubricating stock liquid can be determined and a discharge amount of the alkaline electrolytic water and the lubricating stock liquid to be replenished to the present system can be calculated. In addition in the preferable quality management system of a machining process as described above, since a measurement value of the electric conductivity is corrected based on an anticipated correlation between an assumed amount of change in the metal ion concentration and an amount of change in the electric conductivity, due to sludge from a tool or workpiece being mixed into the lubricating liquid, a measurement of the metal ion concentration is essential, in addition to combining with a measurement of the electric conductivity and a measurement of the sugar content, the concentration, or the pH.

A third present invention is an alkaline electrolytic water generation device for lubricating liquid generation that generates externally replenishable alkaline electrolytic water supplied as a lubricating liquid in the quality management system for a machining process of the first present invention, in which the alkaline electrolytic water generation device is configured to monitor an electric conductivity of the generated alkaline electrolytic water in which a discharge portion of the generated alkaline electrolytic water is connected to the mixing portion, a working liquid storage tank, and a storage tank of the alkaline electrolytic water, or a supply pipe connected to each of the mixing portion, the working liquid storage tank, and the storage tank of the alkaline electrolytic water, and enable presetting or resetting of the electric conductivity of the alkaline electrolytic water generated in accordance with the machining process executed in the machine tool.

In the third present invention, an alkaline electrolytic water generation device for lubricating liquid generation is provided as a dedicated product that is suitable for the above described quality management system for a machining process of the first present invention. In this alkaline electrolytic water generation device, a connection to a working liquid supply flow path within the quality management system for a machining process can be performed, a setting of the generated alkaline electrolytic water can be performed in accordance with the machining process executed by the machine tool, and in the case of a control configuration that readjusts the electric conductivity in real time by performing feedback of a measurement result of the electric conductivity described above, the electric conductivity of the generated alkaline electrolytic water can be reset by a feedback signal. By applying this dedicated device to a known lubricating liquid supply configuration of a machine tool, a system can be constructed that can perform liquid management more easily than that of a conventional emulsion machining liquid, while converting the working liquid of the machine tool to a water solubility having a low environmental load.

Note that, a configuration is exemplified in which the alkaline electrolytic water includes an organic alkali such as triethanolamine, a synthetic lubricant, and a lubricant additive electrolyte solution.

Advantageous Effect of Invention

According to the quality management system for a machining process, a lubricating liquid for a machine tool, and an alkaline electrolytic water generation device for a lubricating liquid of the present invention, by adopting a working liquid using alkaline electrolytic water, and monitoring and managing the electric conductivity, the problems of conventional oil-soluble lubricating liquid that cannot be liquid managed and has a large environmental load can be improved, while securing and improving a machining performance (quality) of electrolytic water as the working liquid.

DESCRIPTION OF EMBODIMENTS

Figure 1:
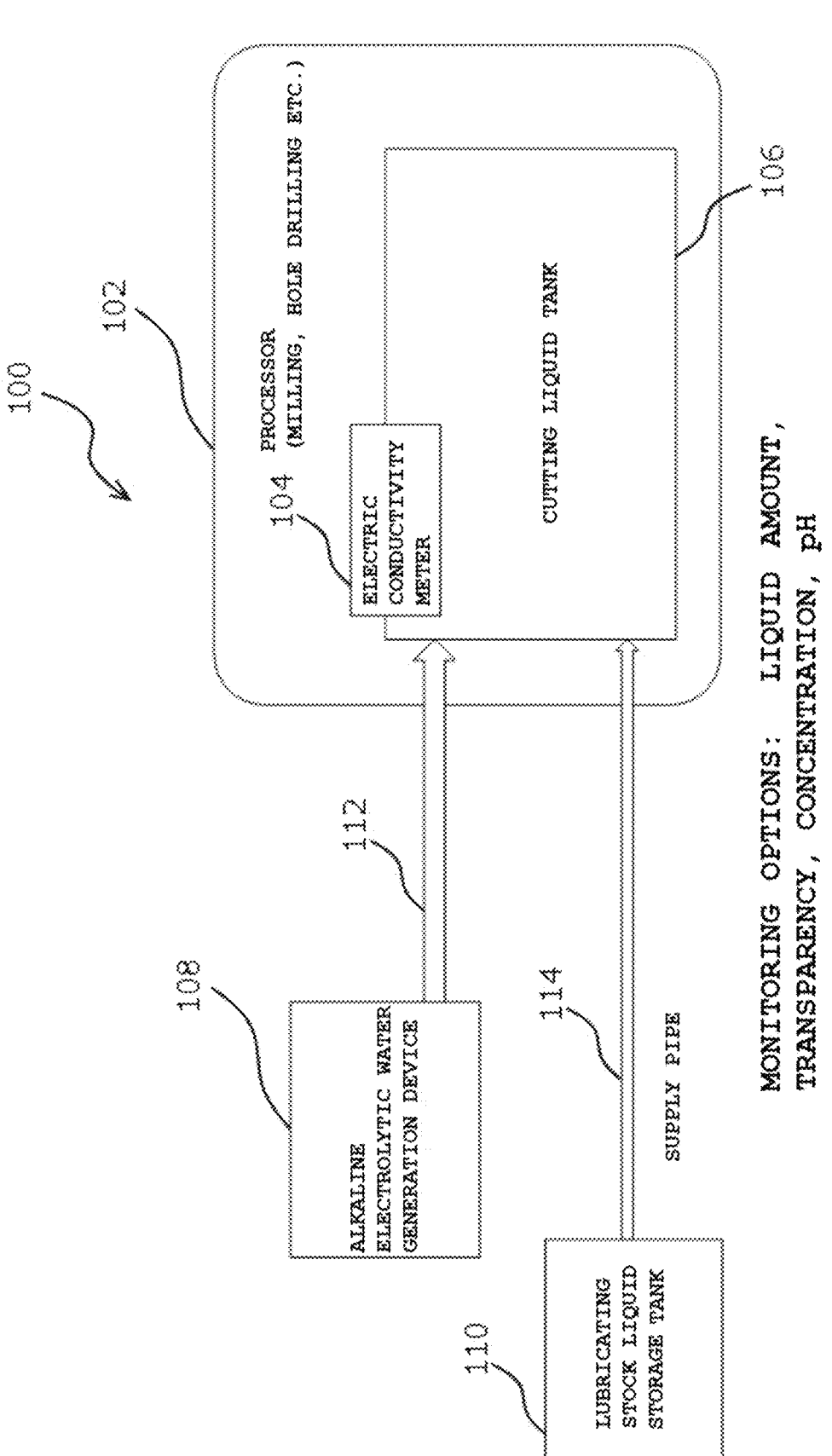
FIG. 1 is a schematic block diagram showing a quality management system for a machining process as a first embodiment of a first present invention.

Hereinafter, embodiments of a quality management system for a machining process of the present invention (first present invention), an alkaline electrolytic water generation device for a lubricating liquid (third present invention), and a lubricating liquid for a machine tool used in this system are exemplified. First, an exemplification is described for an embodiment of the quality management system for machining process of the first present invention (hereinafter, also called a "quality management system") while appropriately exemplifying the alkaline electrolytic water generation device for a lubricating liquid of the third present invention. Note that, in the reference numerals shown in FIG. 2 to FIG. 6, the reference numerals with the same last two digits as those shown in FIG. 1 mean the same type of reference numerals.

<<Quality Management System for a Machining Process and Alkaline Electrolytic Water Generation Device for a Lubricating Liquid>>

FIG. 1 is a schematic block diagram showing a quality management system 100 for a machining process as a first embodiment of the first present invention. A machine tool 102 shown here performs cutting such as milling or hole drilling. In the machine tool 102, there is a flow path in which a working liquid (here, called a "cutting liquid") to be supplied to the vicinity of a cutting portion circulates in the machine tool 102, and there is a cutting liquid tank (working liquid storage tank) 106 that temporarily collects and stores the cutting liquid within this circulation flow path. The cutting liquid stored within the cutting liquid tank 106 (collected liquid of an operating liquid for sliding is also included) is supplied again to the cutting portion by a pump or the like (no illustrated). Note that, in FIG. 1, the circulation flow path of the cutting liquid is omitted.

Moreover, the cutting liquid tank 106 is supplied with a lubricating stock liquid from a supply pipe 114 connected to a lubricating stock liquid storage tank 110 in which a stock liquid of the cutting liquid or the sliding liquid is stored. Moreover, in the quality management system 100, an alkaline electrolytic water generation device 108 (embodiment of the third present invention) for adjusting the electric conductivity within the cutting liquid tank 106 is installed attached to or outside of the machine tool 102. The alkaline electrolytic water generation devices 108 to 608 each generate appropriate alkaline electrolytic water (described below) by enabling presetting or resetting of the electric conductivity of alkaline electrolytic water required in a machining process to be executed by various types of processors (machine tools) used by the quality management systems 100 to 600 for a machining process, and are each a dedicated device of the quality management systems 100 to 600 for a machining process. In the example of FIG. 1, alkaline electrolytic water of a desired amount is supplied to the cutting liquid tank 106 from a supply pipe 112 connected to the alkaline electrolytic water generation device 108, an electric conductivity monitoring device 104 having an electric conductivity meter 104 is provided in the cutting liquid tank 106 or in the surroundings thereof, and monitors (measures, displays) at least the electric conductivity of mixed liquid of the cutting liquid, the alkaline electrolytic water, and the sliding liquid stored in the cutting liquid tank 106.

Moreover, while described below in detail along with experiment verification results of the alkaline electrolytic water used in the quality management system 100, the alkaline electrolytic water is, for example, alkaline water including potassium hydroxide that can obtain potassium carbonate as an electrolyte, a stock liquid having an antirust effect, in which a water-soluble polymer having a pH adjustment action to an extent of pH 7 to 10 is included, is supplied without change as a lubricating stock liquid, and the alkaline electrolytic water from the alkaline electrolytic water generation device 108 is supplied to within the cutting liquid tank 106 by being mixed as strong alkaline electrolytic water.

Figure 2:
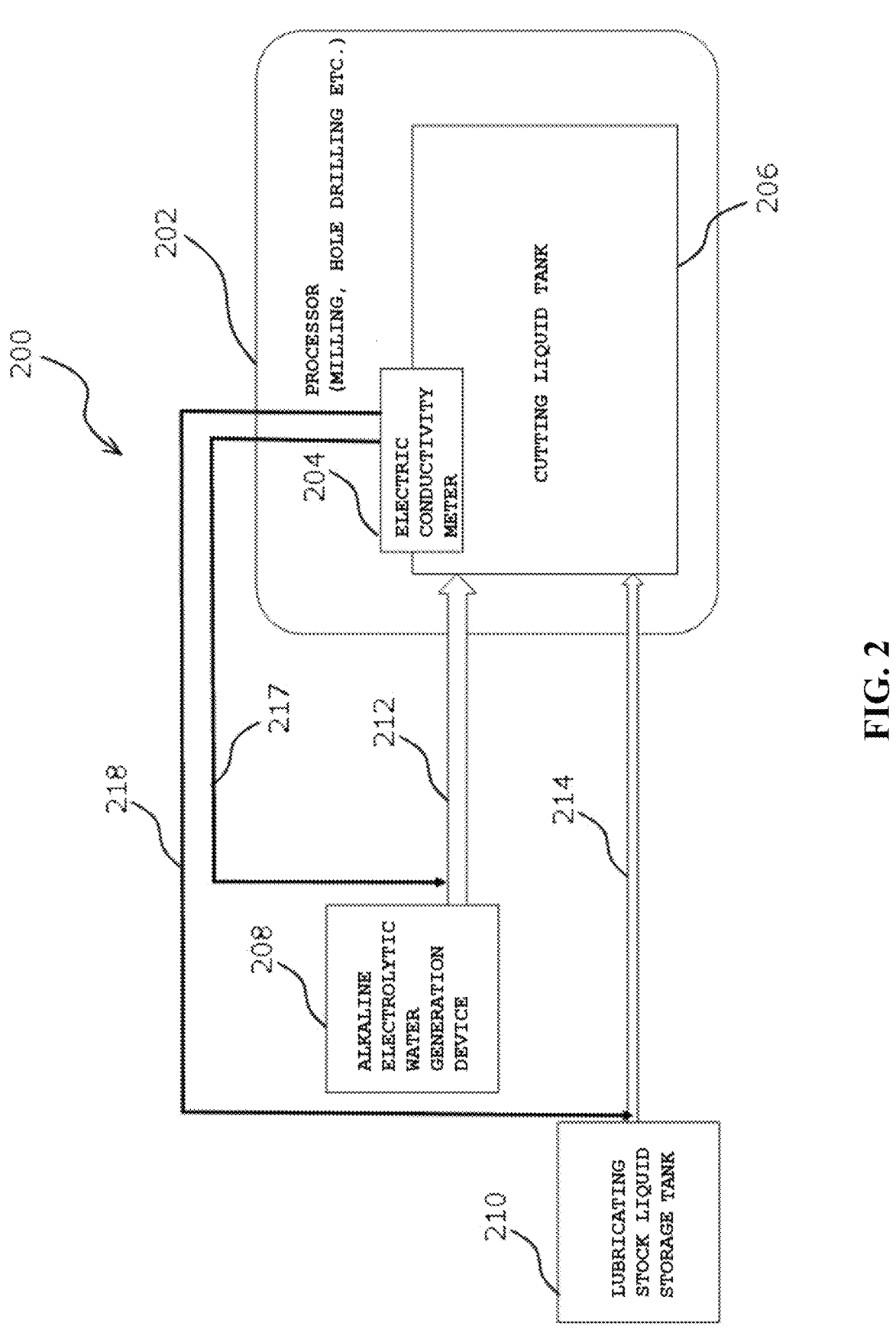
FIG. 2 is a schematic block diagram showing a quality management system for a machining process as a second embodiment of the first present invention.

Next, FIG. 2 shows a schematic block diagram of a quality management system 200 for a machining process as a second embodiment of the first present invention. Note that, in the quality management systems 200 to 600 for a machining process as second to sixth embodiments of FIG. 2 to FIG. 6, the portions different to those of FIG. 1 or the like will be described with emphasis, and the portions the same as or closely resembling those of FIG. 1 or the like will be briefly described or omitted.

Also in FIG. 2, similar to FIG. 1, a machine tool 202 performs cutting such as milling or hole drilling, and has a cutting liquid tank (working liquid storage tank) 206 for collecting and storing a cutting liquid (working liquid) within a flow path that circulates the cutting liquid in the machine tool 202. Moreover, the cutting liquid stored within the cutting liquid tank 206 is supplied again to a cutting portion by a pump or the like (not illustrated), and a lubricating stock liquid is supplied to the cutting liquid tank 206 from a supply pipe 214 connected to a lubricating stock liquid storage tank 210. Moreover, alkaline electrolytic water of a desired amount is supplied to the cutting liquid tank 206 from a supply pipe 212 connected to an alkaline electrolytic water generation device 208 as a dedicated device for adjusting the electric conductivity within the cutting liquid tank 206, and an electric conductivity monitoring device 204 having an electric conductivity meter 204 is provided in the cutting liquid tank 206 or in the surroundings thereof, and monitors (measures, displays) at least the electric conductivity of a mixed liquid of the cutting liquid, the alkaline electrolytic water, and the sliding liquid stored within the cutting liquid tank 206. These configurations are similar to the example of FIG. 1.

In addition to the above configurations, in the quality management system, 200 for a machining process of FIG. 2, there is a control configuration for adjusting the electric conductivity of the mixed liquid within the cutting liquid tank 206 according to results measured by the electric conductivity meter 204. Specifically, in the case where the electric conductivity of the alkaline electrolytic water and the lubricating stock liquid (a collected amount of the sliding liquid is also included) within the cutting liquid tank 206 measured by the electric conductivity meter 204 is outside a preset range by performing feedback of measurement data from the electric conductivity meter 204, a control is performed so that the lubricating stock liquid and the alkaline electrolytic water from each of the lubricating stock liquid storage tank 210 (or its storage tank) and the alkaline electrolytic ater generation device 208 automatically drip to the supply pipes 214 and 208 (refer to reference numerals 218 and 217 showing a feedback signal). This automatic drip control ends when the electric conductivity measured by the electric conductivity meter 204 reaches the preset range. Or, in the case where the electric conductivity of the alkaline electrolytic water and the lubricating stock liquid within the cutting liquid tank 206 is outside a range that measurement data from the electric conductivity meter preset, a volume of a lubricating stock liquid and the alkaline electrolytic water required to reach this range, and an automatic drip time from the Lubricating stock liquid storage tank 210 and the alkaline electrolytic water generation device 208, are calculated, and a control is performed to execute a drip process.

Figure 3:
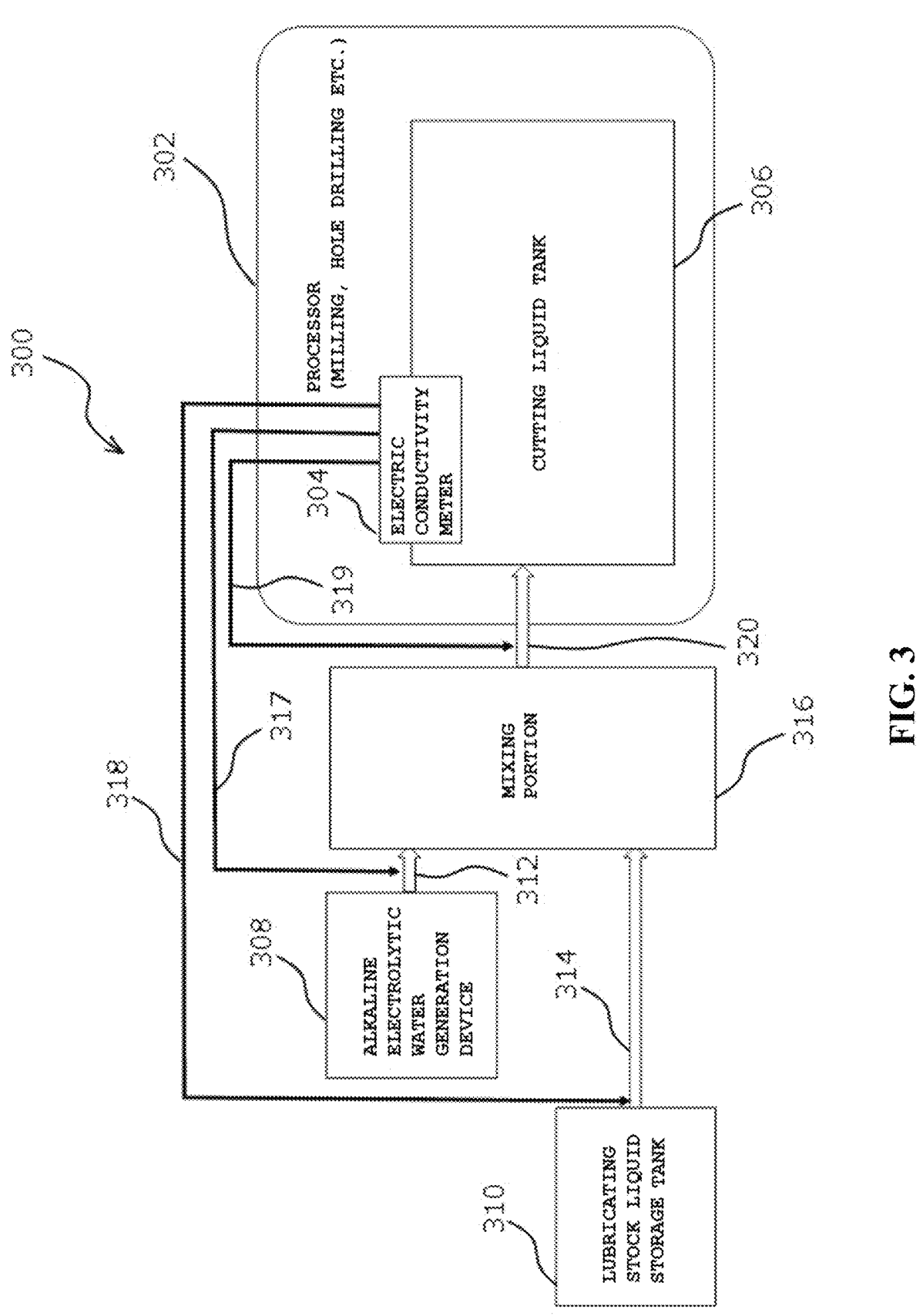
FIG. 3 is a schematic block diagram showing a quality management system for a machining process as a third embodiment of the first present invention.

Next, FIG. 3 shows a schematic block diagram of a quality management system 300 for a machining process as a third embodiment of the first present invention. Moreover, here, a schematic block diagram of a quality management system 500 for a machining process as a fifth embodiment shown in FIG. 5, which closely resembles the example of FIG. 3, will be simultaneously described. Also in FIG. 3 and FIG. 5, similar to FIG. 1 and FIG. 2, a machine tool 302, 502 performs cutting such as milling or hole drilling, has a cutting liquid tank (working liquid storage tank) 306, 506 for collecting and storing a cutting liquid (working liquid) within a flow path that circulates the cutting liquid in the machine tool 302, 502, and forms a circulation flow path in which the cutting liquid stored within the cutting liquid tank 306, 506 is supplied again to the cutting portion. Moreover, similar to the examples of FIG. 1 and FIG. 2, an electric conductivity monitoring device having an electric conductivity meter 304, 504 is provided in the cutting liquid tank 304, 504 or in the surroundings thereof, and monitors at least the electric conductivity of a mixed liquid of the cutting liquid, the alkaline electrolytic water, and the sliding liquid stored within the cutting liquid tank 306, 506 by the electric conductivity meter 304, 504.

Figure 5:
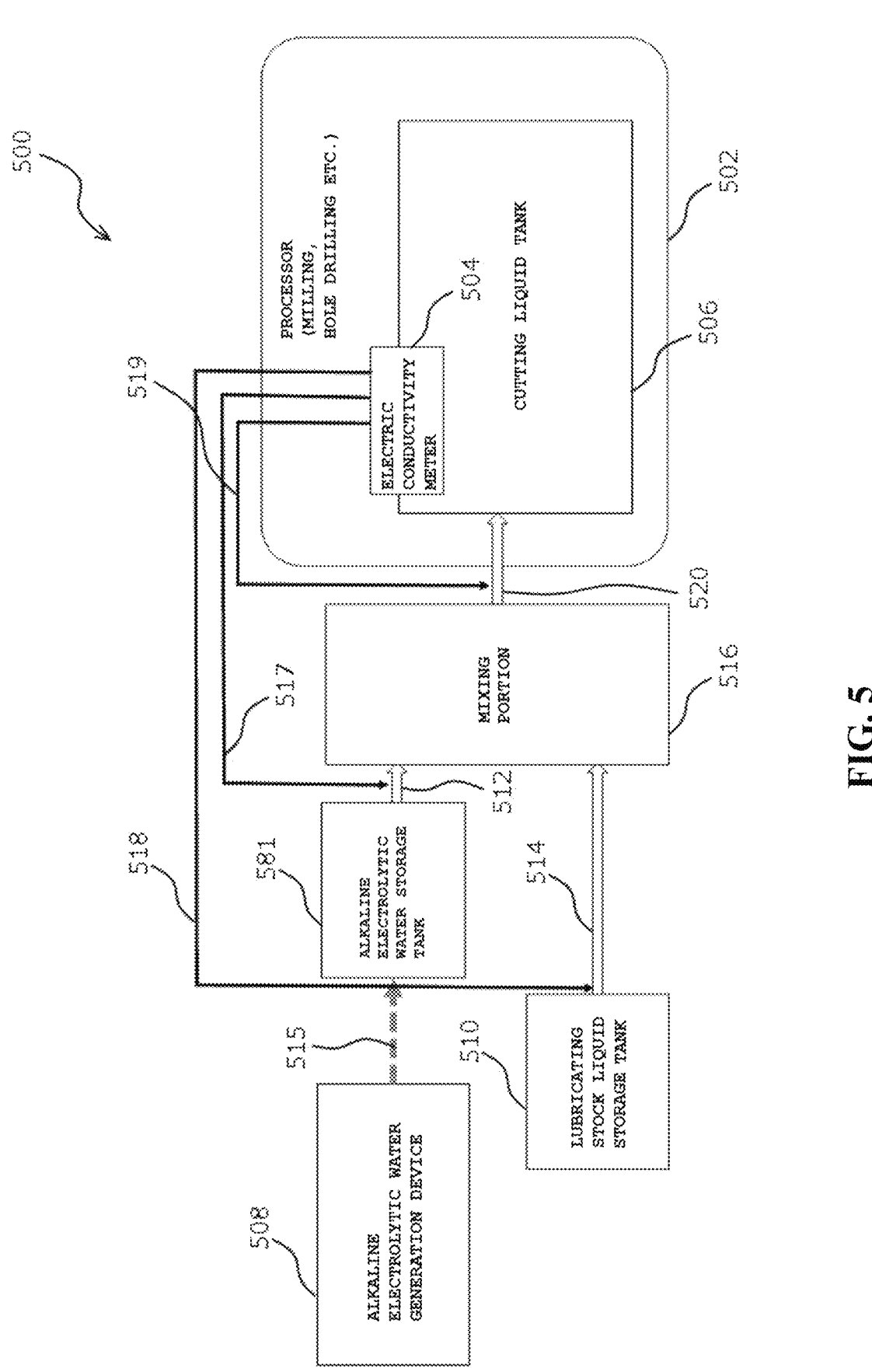
FIG. 5 is a schematic block diagram showing a quality management system for a machining process as a fifth embodiment of the first present invention.

However, in the quality management system 300 for a machining process of FIG. 3, a mixing portion 316, which temporarily mixes and stores the lubricating stock liquid and the alkaline electrolytic water, is provided in the flow path process from the lubricating stock liquid storage tank 310 and the alkaline electrolytic water generation device 308, 508 as a dedicated device to the cutting liquid tank 306. On the other hand, while the quality management system 500 for a machining process of FIG. 5 is also provided with the mixing portion 516, which temporarily mixes and stores the lubricating stock liquid and the alkaline electrolytic water from the lubricating stock liquid storage tank 510 and the alkaline electrolytic water generation device 508, in the example of FIG. 5, the alkaline electrolytic water supplied from the alkaline electrolytic water generation device 508 as a dedicated device is temporarily stored in an alkaline electrolytic water storage tank 509 in a flow path up to a mixing portion 516 (refer to supply pipes 515 and 512), and is then supplied to the mixing portion 516. Also in the case where the processor 502 does not include an alkaline electrolytic water generation device, when adopting this configuration, a system similar to the quality management system 300 for a machining process of FIG. 3 can be easily constructed by fluidly connecting a dedicated alkaline electrolytic water generation device 508, which is appropriate for the quality management system 500 of a machining process of the present invention, to an alkaline electrolytic water storage tank 581.

Specifically, in the examples of FIG. 3 and FIG. 5, the lubricating stock liquid is supplied from the lubricating stock liquid storage tank 310, 510 via a supply pipe 314, 514 to the mixing portion 316, 516, and the alkaline electrolytic water is supplied from the alkaline electrolytic water generation device 308 via the supply pipe 312, or from the alkaline electrolytic water generation device 508 via the supply pipe 515, the alkaline electrolytic water storage tank 581 and the supply pipe 512, to the mixing portion 316, 516, similar to the lubricating stock liquid. Afterwards, a mixed liquid of the lubricating stock liquid and the alkaline electrolytic water from the mixing portion 316, 516 is supplied to the cutting liquid tank 306, 506 via a supply pipe 320, 520.

Moreover, also in the examples of FIG. 3 and FIG. 5, similar to FIG. 2, while the electric conductivity of the mixed liquid within the cutting liquid tank 306, 506 is adjusted by controlling a supply of the lubricating stock liquid and the alkaline electrolytic water by performing feedback of measurement data of the electric conductivity meter 304, 504, a transmission destination of a feedback signal is added by having the mixing portion 316, 516 interposed in the flow path process as described above. Specifically, in addition to a configuration that controls a supply amount from the alkaline electrolytic water generation device 308, 508 or the lubricating stock liquid storage tank 310, 510 by performing feedback of measurement data of the electric conductivity of the mixed liquid within the cutting liquid tank 306, 506 measured by the electric conductivity meter 304, 504 (reference numerals 318 and 317, reference numerals 518 and 517), a configuration that also controls a supply amount from the mixing portion 316, 516 by performing feedback of measurement data of the electric conductivity of the mixed liquid within the cutting liquid tank 306, 506 (reference numeral 320, 520) is added, and the electric conductivity of a most downstream mixed liquid supplied to the cutting liquid tank 306, 506 is adjusted and con rolled.

Figure 4:
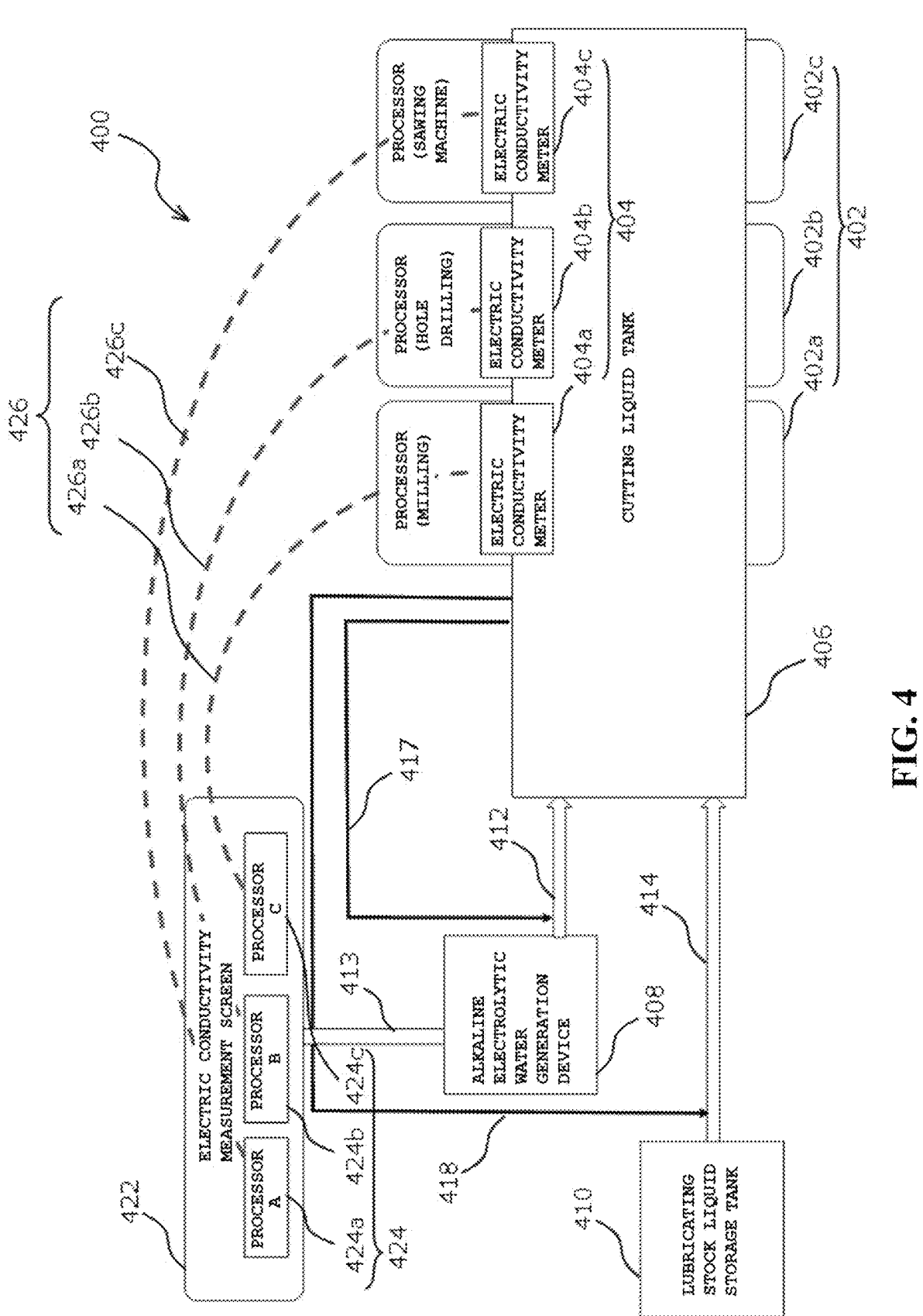
FIG. 4 is a schematic block diagram showing a quality management system for a machining process as a fourth embodiment of the first present invention.

Next, FIG. 4 shows a schematic block diagram of a quality management system 400 for a machining process as a fourth embodiment of the first present invention. The example of FIG. 4 is the same as the examples of FIG. 2 and FIG. 3 for the points of a cutting liquid stored within a cutting liquid tank (working liquid storage tank) 406, which collects and stores the cutting liquid in a flow path that circulates in a machine tool 402, is monitored by an electric conductivity monitoring device having an electric conductivity meter 404 provided in the cutting liquid tank 408 or in the surroundings thereof, and the electric conductivity of a mixed liquid within the cutting liquid tank 406 is adjusted by controlling a supply of a lubricating stock liquid and alkaline electrolytic water by performing feedback of the measurement data.

However, the quality management system 400 for a machining process of FIG. 4 is more advanced than the systems of FIG. 2 and FIG. 3 for in terms of simultaneously monitoring the electric conductivity of the cutting liquid in a plurality of machine tools 402a to 402c, and managing the electric conductivity in a centralized manner by controlling a supply amount of the lubricating stock liquid and the alkaline electrolytic water.

In the quality management system 400 for machining process of FIG. 4, an example is shown for simultaneously managing the plurality of machine tools 402, for example, a processor 402*a* that performs milling, a processor 402*b* that performs hole drilling, and a processor 402*c* as a sawing machine. First, the cutting liquid circulating in the processors 402*a* to 402*c* is uniformly collected and stored in a same cutting liquid tank 406, and the electric conductivity of the cutting liquid within the cutting liquid tank 406 is monitored (measured, displayed) by an electric conductivity meter 404*a* to 404*c* included in each of the processors 402*a* to 402*c*.

Moreover, similar to the cutting liquid tank 406, a lubricating stock liquid storage tank 410, an alkaline electrolytic water generation device 408 as a dedicated device and supply pipes 414, 412 therefrom are unified that perform a supply of a lubricating stock liquid and alkaline electrolytic water to the cutting liquid tank 406. Moreover, also in the example of FIG. 4, similar to the examples of FIG. 2 and FIG. 3, while the electric conductivity of a mixed liquid within the cutting liquid tank 406 is adjusted by controlling a supply of the lubricating stock liquid and the alkaline electrolytic water by performing a feedback of measurement data of the electric conductivity meter 404, the measurement data by each of the electric conductivity meters 404*a* to 404*c* for each of the processors (machine tools) 402*a* to 402*c* is wirelessly transmitted via WiFi or the like (refer to dotted lines 426*a* to 426*c*), and is simultaneously displayed within a window 424 corresponding to each of the processors 402*a* to 402*c* on a display (electric conductivity measurement screen) of an external PC 422 that is connected to the alkaline electrolytic water generation device 408 (refer to reference numerals 424*a* to 424*c*).

Moreover, a configuration is adopted in which the measurement data of the electric conductivity of the mixed liquid within the cutting liquid tank 406 measured by the electric conductivity meter 404*a* to 404*c* for each of the processors 402*a* to 402*c* is fed back and thereby a supply amount of the lubricating stock liquid and the alkaline electrolytic water from a supply pipe 414, 412 of the alkaline electrolytic water generation device 408 or the lubricating stock liquid storage tank 410 is controlled (reference numerals 418, 417). Moreover, at the same time as the electric conductivity meters 404*a* to 404*c* transmitting a feedback signal (reference numerals 418, 417), a supply amount (automatic drip amount per time, automatic drip time or the like) of the lubricating stock liquid and the alkaline electrolytic water is displayed on each windows 424*a* to 424*c* on the display 422 (electric conductivity measurement screen) of the external PC 422.

Figure 6:
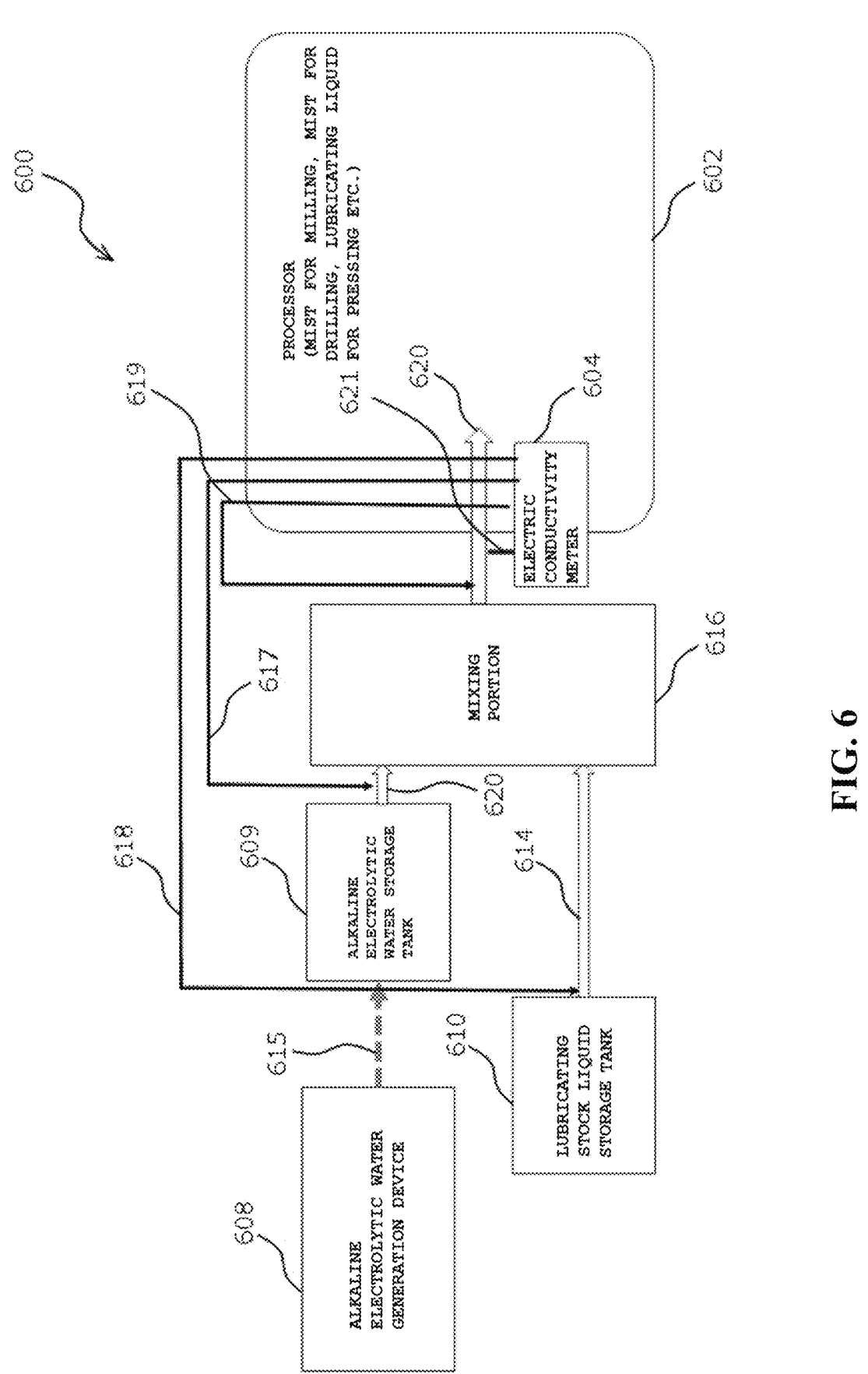
FIG. 6 is a schematic block diagram showing a quality management system for a machining process as a sixth embodiment of the first present invention.

Finally, FIG. 6 shows a schematic block diagram of a quality management system 600 for a machining process of a sixth embodiment of the first present invention, which assumes a processor (machine tool) having an electrical discharging process of mist for milling, mist for drilling, a lubricating liquid for pressing or the like, as a modified example of FIG. 5. Also in FIG. 6, different to the example of FIG. 5, a circulation flow path of the working liquid is not formed, and there is no cutting liquid tank 504 or the like that collects and stores the working liquid such as in FIG. 5. Therefore, an electric conductivity monitoring device having an electric conductivity meter 604 measures and manages the electric conductivity of the most downstream that supplies a mixed liquid from a mixing portion 616, which temporarily mixes and stores a lubricating stock liquid and alkaline electrolytic water, namely, the electric conductivity of a mixed liquid within a supply pipe 620 that is connected to the mixing portion 616.

Moreover, also in the example of FIG. 6, similar to the example of FIG. 5, a configuration is adopted in which alkaline electrolytic water supplied from a alkaline electrolytic water generation device 608 as a dedicated device is temporarily stored in an alkaline electrolytic water storage tank 609 in a flow path leading to the mixing portion 616 (refer to supply pipes 615, 612), and is then supplied to the mixing portion 616, a configuration is adopted in which measurement data of the electric conductivity of the mixed liquid within a supply pipe 620 measured by the electric conductivity meter 604 is fed back and thereby a supply amount from the alkaline electrolytic water generation device 608, the lubricating stock liquid storage tank 610, and the mixing portion 616 is controlled (reference numerals 618, 617, 619), and the electric conductivity of the mixed liquid supplied from the mixing portion 621 and discharged to a machining portion in the machine tool 602 is adjusted and controlled.

Note that, in the quality management systems 100 to 600 for a machining process of FIG. 1 to FIG. 6 described above, while the electric conductivity of the mixed liquid of the lubricating stock liquid and the alkaline electrolytic water within the cutting liquid tank 106 to 506 or the supply pipe 620 is monitored and managed by the electric conductivity meter 104 to 604, in the quality management systems 100 to 600 for a machining process, there may be cases in which measurements of a sugar content (Brix % measurement or the like), a concentration, and a pH are combined and managed, in addition to a measurement of the electric conductivity. Moreover, as described below in detail, there may be cases in which a metal ion concentration of the mixed liquid the same as a measurement by the electric conductivity meter is measured in order to improve the measurement accuracy of the electric conductivity. In addition, there may be cases in which a liquid surface height of the cutting liquid tank 106 to 506 or the mixing portion 616 is measured by using a water level meter in order to manage an overall liquid amount of the working liquid in the quality management systems 100 to 600 for a machining process.

<<Index in Alkaline Electrolytic Water as a Lubricating Liquid (Working Liquid) and Liquid Management Thereof>>

Next, electrolytic water as the working liquid used in the quality management systems 100 to 600 for a machining process of the first present invention described above and the alkaline electrolytic water generation device 108 to 608 for lubricating liquid generation of the second invention as a dedicated device thereof is described. As shown in Table 1 to Table 3 and FIG. 7 to FIG. 9, while form concentrations of various types of lubricating liquids are compared for the three variables of pH, sugar content, and electric conductivity, these variables show completely different behaviors, which is described in detail below and the appropriateness of each of the variables as an index when performing liquid management as a lubricating liquid (working liquid) is discussed.

Table 1 shows, for alkaline electrolytic water and commercially available oil of each dilution concentration (wt %: weight %) with respect to electrolytic water, pure water, tap water, and a stock liquid of each pH, measurement experimental results of electric conductivity and Brix % as a list. Correlation Between General-Purpose Emulsion Lubricating Liquid and pH, Sugar Content, and Electric Conductivity First, from column 14 to column 17 of Table 1, FIG. 9, and Table 3, it can be seen that in a general-purpose emulsion ("commercially available ME" shown in column 14 to column 17 of Table 1: 10 wt % dilution of oily agent blended emulsion tap water) used as a general lubricating liquid (working liquid) neither the pH, the electric conductivity, nor the sugar content (Brix %) can be sufficiently measured, regardless of the stock liquid or the dilution concentration (20 wt % to 2 wt %) with respect to this stock liquid. Therefore, in the case where a general-purpose emulsion type oily agent, which includes many oily materials such as mineral oil, is used as a lubricating liquid (working liquid), there is no index that can correctly perform monitoring from the viewpoint of liquid management, and it is verified that liquid management more than the operator's experience management cannot be performed.

Figure 7:
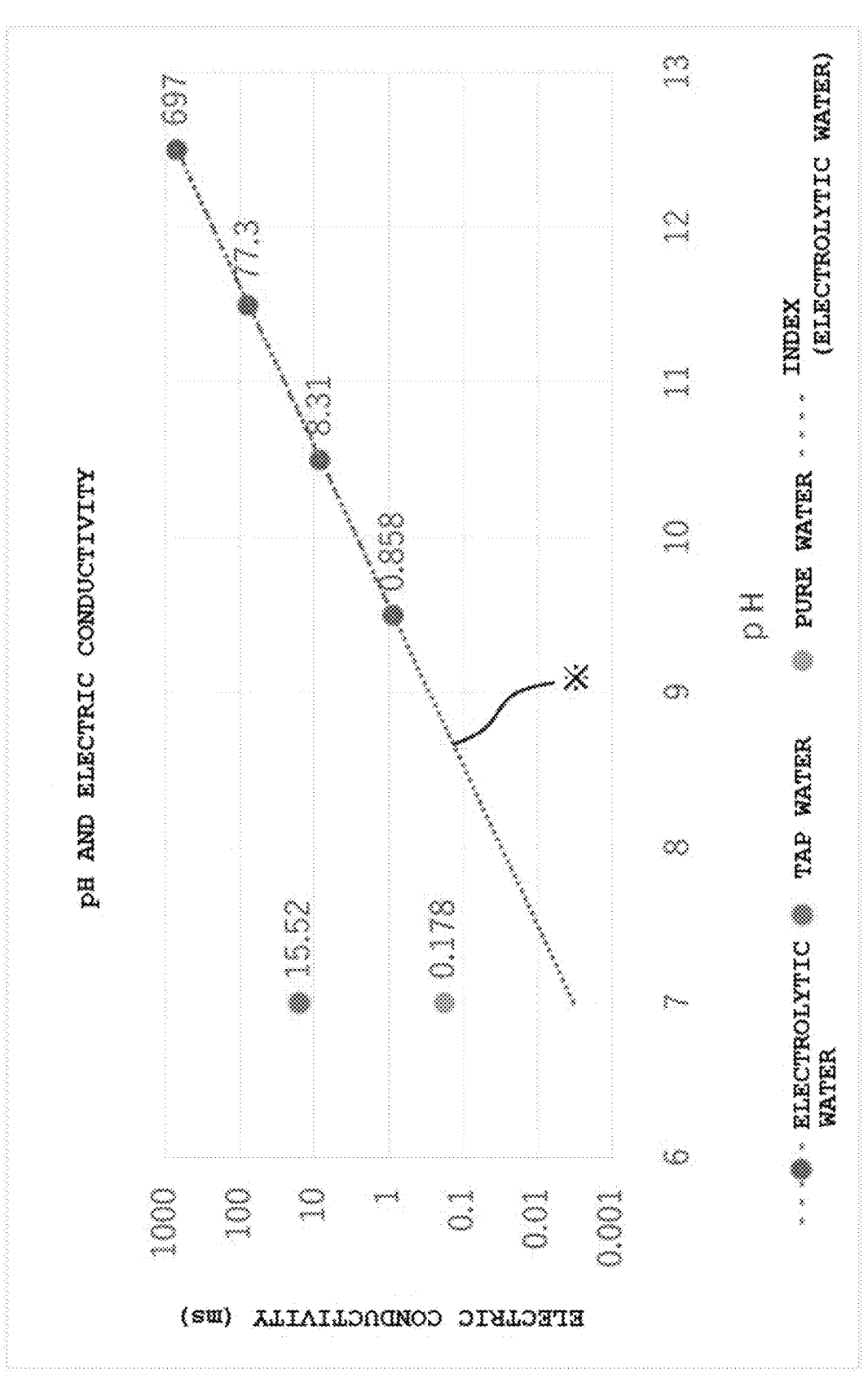
FIG. 7 is a graphic diagram showing alkaline electrolytic water, pure water, and tap water of each pH, and the electric conductivity of each of these.

Relationship Between Sugar Content (Brix %), pH, and Electric Conductivity of Electrolytic Water In the uppermost column and column 4 of Table 1, measurement results of the electric conductivity are shown in the case where electrolytic water with a pH of 12.5 (in Table 1, described as "electrolytic water") is diluted with pure water. Moreover, FIG. 7 is a graphic diagram showing electrolytic water, pure water, and tap water of each pH, and the electric conductivity thereof, by extracting the measurement results from the uppermost column to column 4 of Table 1. Here, pH is a unit that represents the extent of hydroxide ions "OH—" (hereinafter, simply referred as "hydroxide ions" or "OH—") present in liquid in an alkaline region, the number of hydroxide ions increases tenfold when the pH increases by one, the number of hydroxide ions decreases to one tenth when the pH decreases by one, and in

TABLE 1

ELECTRIC CONDUCTIVITY AND Brix % MEASUREMENT EXPERIMENTAL RESULTS

| ELECTROLYTIC WATER | pH (PURE WATER DILUTION) | 9.5 | 10.5 | 11.5 | 12.5 | | | |
|---|---|---|---|---|---|---|---|---|
| | ELECTRIC CONDUCTIVITY | 0.858 ms | 8.31 ms | 77.3 ms | 697 ms | | | |
| PURE WATER | ELECTRIC CONDUCTIVITY | 0.178 ms | | | | | | |
| TAP WATER | ELECTRIC CONDUCTIVITY | 15.52 ms | | | | | | |
| WORKING LIQUID | SP DILUTION CONCENTRATION (EW pH 12.5) | STOCK LIQUID | 45 wt % | 30 wt % | 20 wt % | 10 wt % | 5 wt % | 2 wt % |
| | ACTIVE COMPONENT CONCENTRATION | 63 wt % | 30 wt % | 20 wt % | 12.6 wt % | 6.2 wt % | 3.15 wt % | 1.26 wt % |
| | Brix % | 29.5 | 24 | 17.7 | 12.4 | 6.2 | 3.2 | 1.3 |
| | ELECTRIC CONDUCTIVITY (REMEASUREMENT ELECTRODE 2/2 IMMERSION) | 202 ms | 581 ms | 600 ms | 552 ms | 413 ms | 317 ms | 366 ms |
| | SLIDING SURFACE OIL 1 wt % MIXTURE DIRECTLY AFTER SHAKING Brix % | | | | 13.0-13.5 | | | |
| | 5 MINUTES STANDING | | | | 12.5 | | | |
| | SLIDING SURFACE OIL 3 wt % MIXTURE DIRECTLY AFTER SHAKING Brix % | | | | 12.3 | | | |
| | 5 MINUTES STANDING | | | | HHH/12.2 | | | |
| | ABOVE DESCRIBED ELECTRIC CONDUCTIVITY | | | | MEASUREMENT VALUE 501 ms | | | |
| | COMMERCIALLY AVAILABLE ME Brix % | STOCK LIQUID | — | — | 20 wt % 33.3/26.9/20.0/14.9 UNSTABLE | 10 wt % NON-MEASURABLE | 5 wt % | 2 wt % |
| | ELECTRIC CONDUCTIVITY SLIDING SURFACE OIL MIXTURE | | | | 40-100 ms UNSTABLE | | | |

TABLE 3

| | Brix % | ELECTRIC CONDUCTIVITY |
|---|---|---|
| MEASUREMENT 1 | 33.2 | ERROR |
| MEASUREMENT 2 | 26.9 | 40 |
| MEASUREMENT 3 | 20 | 100 |
| MEASUREMENT 4 | 14.9 | ERROR | an alkaline region, the hydroxide ion concentration increases as the numerical value of pH increases. In the measurement experimental results of Table 1, the electric conductivity of liquid in which electrolytic water of a pH of 12.5 is diluted tenfold with pure water (pH predicted value of 11.5) becomes 77.3 ms, and is approximately ⅑. On the other hand, the electric conductivity of electrolytic water diluted tenfold with pure water (pH predicted value of 10.5) becomes 8.318 ms, and is approximately ⅑. In addition, the electric conductivity of electrolytic water diluted tenfold with pure water (pH predicted value of 9.5) becomes 0.858 ms, and is approximately 1/10.

In this measurement result, the electric conductivity of 8.31 ms is 1/2 that of tap water and the electric conductivity of 0.858 is a value significantly smaller than that of tap water, and since this is a value less than the electric conductivity of tap water when diluted a hundredfold by pure water, the electric conductivity does not match a simple theoretical value of a hydroxide ion concentration (pH) (refer to the dotted line of * of FIG. 7). It can be seen that this has a large influence on the electric conductivity even if the content of impurities in pure water or tap water is minute, and that it is difficult to perform liquid management by pure water or tap water with an electric conductivity as an index based on a theoretical value of pH. Therefore, it can be seen that pure water or tap water is not preferable from the viewpoint of liquid management even by electrical discharging or water-jetting using pure water or tap water for a working liquid. On the other hand, in the case of electrolytic water having a pH equal to or more than a prescribed value (alkaline electrolytic water), it can be seen that there is a positive correlation between the pH and the electric conductivity. Therefore, in the case where alkaline electrolytic water is used as a lubricating liquid such as a working liquid of a machine tool, it can be seen that there is a possibility of becoming an index of liquid management by the electric conductivity. According to the above description, it can be seen that this electric conductivity is preferable for an index of liquid management, by using alkaline electrolytic water as a lubricating liquid such as a working liquid of a machine tool.

Figures 8A, 8B, 8C:
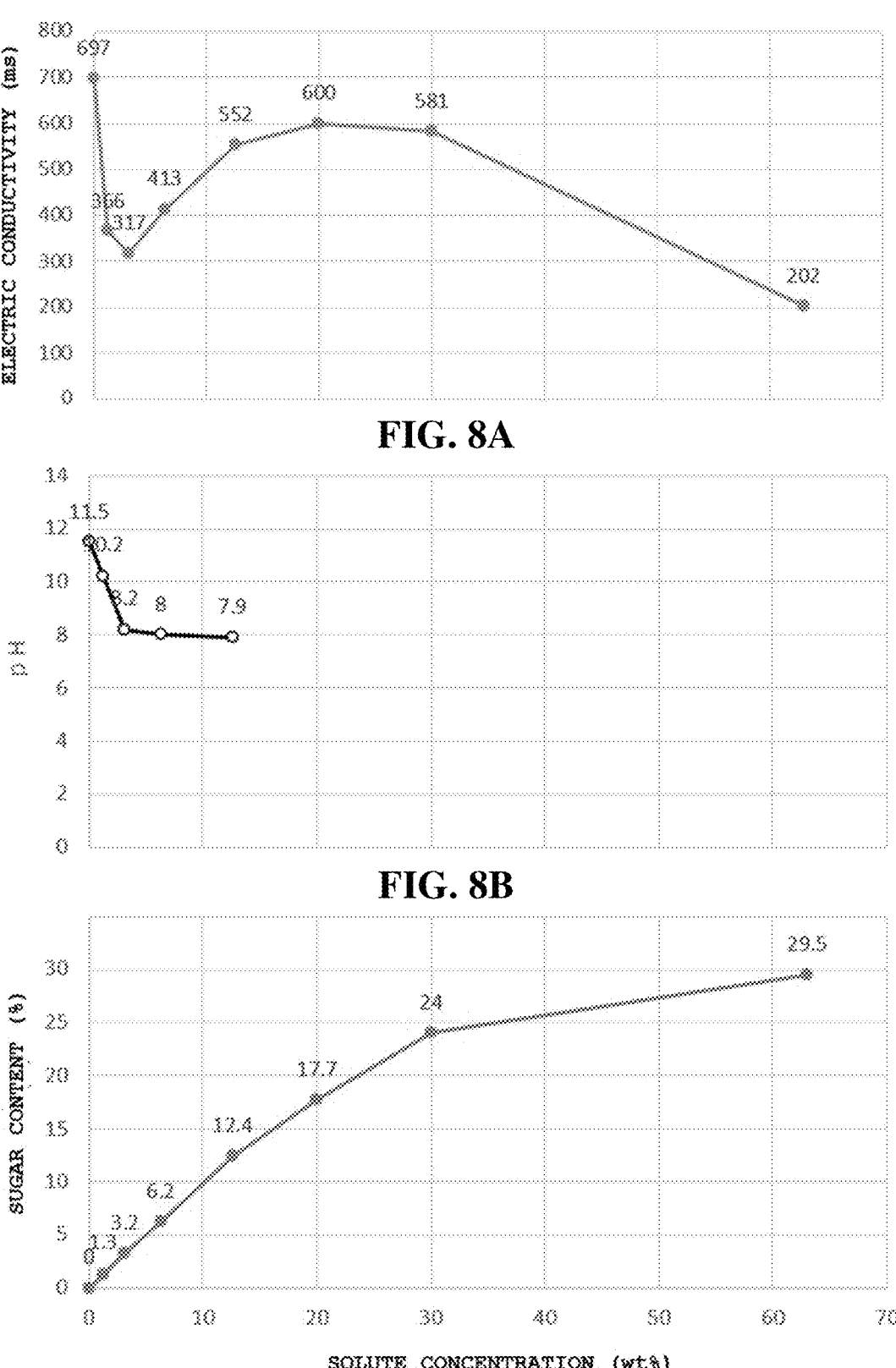
FIG. 8A is a graphic diagram showing measurement values of each solute concentration of a liquid dedicated for alkaline electrolytic water, and the electric conductivity for each of the solute concentrations.
FIG. 8B is a graphic diagram showing measurement values of each solute concentration of a liquid dedicated for alkaline electrolytic water, and the pH for each of the solute concentrations.
FIG. 8C is a graphic diagram showing measurement values of each solute concentration of a liquid dedicated for alkaline electrolytic water, and the sugar content (Brix %) for each of the solute concentrations.
Figure 9:
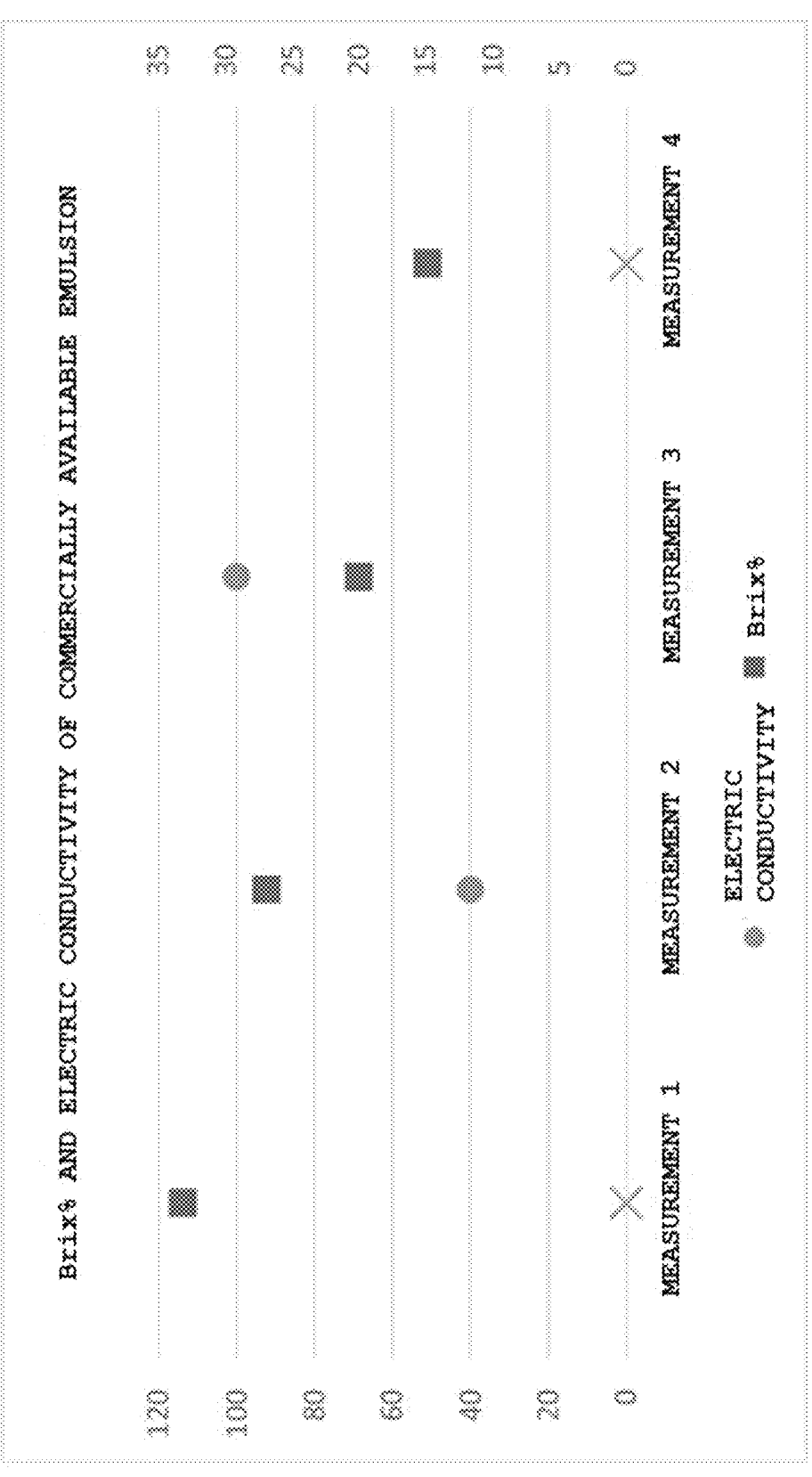
FIG. 9 is a graphic diagram showing measurement results of the sugar content (Brix % value) and the electric conductivity of commercially available emulsions.

Next, column 5 to column 13 of Table 1 show results in which a concentration of alkaline electrolytic water (in Table 1 and the following description, described as "electrolytic water dedicated liquid SP") of a stock liquid with a pH of 12.5 dedicated for a lubricating liquid (working liquid) of the machine tool developed by the present applicant is changed by diluting with pure water from the stock liquid, and an effective component concentration, sugar content (Brix %), and electric conductivity of the electrolytic water dedicated liquid SP of each concentration (stock liquid of 45 wt % to 2 wt %) is measured. Moreover, FIGS. 8A-8C are graphic diagrams that show, with a horizontal axis set as an effective component concentration of each solute concentration wt % of a common electrolytic water dedicated liquid SP, measurement values of the electric conductivity with respect to an effective component concentration of the solute concentration wt % (FIG. 8A), a pH (FIG. 8B), and a measurement value of sugar content (Brix %) (FIG. 8C). Note that, while the concentration of the electrolytic water dedicated liquid SP in the graphic diagram of FIGS. 8A-8C plot the electric conductivity ms, the pH, and the sugar content (Brix %) shown in Table 2 for each of a stock liquid (dilution concentration of 100 wt %=active component concentration of 63 wt %), a dilution concentration of 45 wt % (=active component concentration of 30 wt %), a dilution concentration of 30 wt % (=active component concentration of 20 wt %), a dilution concentration of 20 wt % (=active component concentration of 12.6 wt %), a dilution concentration of 10 wt % (=active component concentration of 6.2 wt %), a dilution concentration of 5 wt % (=active component concentration of 3.15 wt %), and a dilution concentration of 2 wt % (=active component concentration of 1.26 wt %) (pH is plotted only up to a dilution concentration of 20 wt % (=active component concentration of 12.6 wt %)), when the dilution concentration of a solute concentration wt % as a concentration in the graphic diagram of FIGS. 8A-8C are set as a reference with no change, since the active component concentration becomes a value less than 100 wt % even if it is a solute concentration wt % of the stock liquid, a solute concentration wt % of the horizontal axis is plotted with the active component of Table 1 set as a reference so that the relationship with the active component concentration can be perceived here. Hereinafter, when simply describing a solute concentration, an active component concentration is meant.

Here, the lubricating liquid in the machine tool developed by the present applicant described in columns 5 to 13 of Table 1, in addition to setting a water-soluble material as a base, does not blend an antiseptic agent (for the purpose of reducing bacteria growth) including a base oil derived from mineral oil, or elements such as chlorine, sulfur, and phosphorus, as an additive agent, and blends an alkaline agent that promotes an antiseptic effect by maintaining the pH of the water-soluble material. Therefore, when the present operating liquid and working liquid are adopted, it is beneficial not only in (i) reducing a bad smell due to bacteria growth, but also in (ii) preventing rough hands of a worker caused by chlorine, sulfur, phosphorus or the like included in an antiseptic agent of a lubricating liquid of a conventional oil-soluble material.

First, from the results of column 5 to column 8 of Table 1 and FIGS. 8A-8C, it can be seen that the sugar content (Brix %) has a value of a solute concentration of the electrolytic water dedicated liquid SP that decreases as an active component concentration from the stock liquid (active component concentration of approximately 60 wt %) decreases (refer to FIG. 8C). By this meaning, it can be seen that the sugar content (Brix %) has a radially shaped positive correlation in a wide range of solute concentrations. Therefore, it is seen as a very effective monitoring variable as a quality index of a working liquid. However, as shown in the following "Influence confirmation of sliding oil (sliding surface oil)", an actual measurement of the sugar content (Brix %) by a sugar content meter has a measurement sugar content that varies as soon as a sliding oil is mixed, and it is difficult to adopt as a monitoring variable with no environmental dependance when taking into consideration the actual machining environment of the machine tools.

On the other hand, it can be seen that the electric conductivity has a high value of approximately 700 ms at the time when a solute concentration of the electrolytic water dedicated liquid SP is 0 wt % as shown in FIG. 8A, and the electric conductivity suddenly decreases similar to the behavior of the pH (refer to FIG. 8B) along with a small added amount of a solute concentration. This is because, in a low solute concentration region, OH— ions are the main carriers of electric conductivity, and the electric conductivity decreases at the same time as the pH decreases along with solute addition. In contrast to this, it can be seen that the electric conductivity turns to an increase when a solute concentration exceeds 3 wt %, and has a positive correlation with respect to an increase in a solute concentration up to 20 wt %. This is because while OH— ions are stabilized by a pH adjustment function of a solute concentration when the solute concentration is increased, since the ionized component within the solution become a carrier responsible for electric conductivity, it can be inferred that the solute concentration and the electric conductivity have a positive correlation. A region where the electric conductivity and the solute concentration have a positive correlation (in FIG. 8A, approximately 2 wt % to 25 wt %) is certainly an optimal machining region that includes both lubrication and cooling of machining such as cutting, and is a solute concentration region that is actually used (practical management concentration region). Therefore, it can be seen that the electric conductivity is a practically optimal monitoring variable as a quality index of a working liquid.

Moreover, it can be seen that an electric conductivity measurement has a sensing reduction of a probe that is low, with respect to the mixing of sliding oil as shown in the following "Influence confirmation of sliding oil (sliding surface oil)", and works with great efficiency in an actual machine tool environment as a monitoring index. It can be is added at 3 wt %, the Brix % becomes unmeasurable (HHH=a value that is unstable and cannot be held) five minutes after mixing. In contrast to this, even under a condition in which a sliding surface lubricating oil is added and mixed at 3 wt % such that the electric conductivity cannot be measured by the sugar content meter (B ix meter), the electric conductivity is measurable, although there is a difference to the extent of 10% in a value when compared to a clean condition.

TABLE 2

|  | REFERENCE | SLIDING OIL 1 wt % | | SLIDING OIL 3 wt % | |
| --- | --- | --- | --- | --- | --- |
| SP20 wt % | — | IMMEDIATELY AFTER MIXING | 5 MINUTES AFTER MIXING | IMMEDIATELY AFTER MIXING | 5 MINUTES AFTER MIXING |
| Brix % | 12.4 | 13.0~13.5 | 12.5 | 12.3 | ERROR |
| ELECTRIC CON-DUCTIVITY ms | 304 (552) | — | — | — | 270 (501) | seen that the electric conductivity increases from a stock liquid (from an active component concentration of 63 wt %) up to an active component concentration of 20 wt %, and an upper limit value is present at an intermediate point of approximately 25 wt % of the active component concentration from 0 wt % to 20 wt %. In addition, it can be seen that the electric conductivity decreases as the active component concentration decreases, and a Lower limit value is present at an intermediate point of the active component concentration from 3.15 wt % to 1.26 wt %. Therefore, it can be seen that the electric conductivity has a positive correlation only in an active component concentration from approximately 25 wt % to 2 wt %, and with this meaning, in the case where the electric conductivity is set as an index, a range of approximately 25 wt % to 2 wt % of a solute concentration (active component concentration) becomes an actual management concentration that can become an index of liquid management.

Namely, in the electrolytic water dedicated liquid SP, an electric conductivity up to a solute concentration (active component concentration) of 2 to 25 wt % is suitable as an index for monitoring the performance of a working liquid (lubricating liquid) such as a cutting liquid, and in the case where outside this range, it is possible to appropriately combine monitoring of Brix % (the difficulties of liquid management by only Brix % and pH are described above and described below).

Influence Confirmation of Sliding Oil (Sliding Surface Oil)

As can be seen from FIGS. 8A-8C, it is possible to determine the concentration to some extent by the sugar content (Brix %) if a lubricating liquid (working liquid) such as a cutting liquid of the machine tool is in an ideal fine state. However, at a machining site, an ideal state is not maintained due to the influence of contaminated machine oil and by having sliding oil mixed in the working liquid, it can be seen that a measurement result of the sugar content (Brix %) becomes variable. Specifically, as shown in Table 2, which extracts column 9 to column 13 of Table 1 and the measurement results, a measurement result of the sugar content (Brix %) starts receiving an influence, by simply adding and mixing a sliding surface lubricating oil of 1 wt % to an experimental liquid of the electrolytic water dedicated liquid SP, and in the case where the sliding surface lubricating oil According to the above described measurement results and observations thereof, knowledge is obtained in which an electric conductivity measurement is practical and effective as an index of liquid management of a machine tool compared to a conventional sugar content measurement or pH measurement, with respect to management of a lubricating liquid with alkaline electrolytic water as a base. The quality management system for a machining process of the present invention described above is created based on this knowledge. Moreover, in the case where the quality management system for a machining process or the alkaline electrolytic water generation device for lubricating liquid generation of the present invention is introduced under exceptional circumstances that desire monitoring outside a practical range, or into an existing system that performs monitoring by the sugar content (Brix %) or the pH, it is possible to appropriately combine the monitoring of the sugar content (Brix %) and the pH, while taking into consideration the measurement results. Moreover, since the lubricating liquid for a machine tool with alkaline electrolytic water as a base used for the present invention does not include an additive agent or an antiseptic agent derived from mineral oil, disposal is unnecessary, a liquid disposal cost is eliminated, and an environment load is significantly reduced. In addition, the lubricating liquid with alkaline electrolytic water as a base not decaying and having disposal unnecessary means basically that the working liquid is not reduced except liquid replenishment of an evaporation amount. Therefore, it can be optimized as a lubricating liquid that is semi-permanently operated by the quality management system of the present invention.

Correction of a Measurement Value of the Electric Conductivity (mS/m)

On the other hand, although the lubricating liquid with alkaline electrolytic water as a base basically does not require a waste liquid process semi-permanently, chips or the like (sludge) generated at the time of machining when actually executing machining for a long time are mixed into the lubricating liquid, and it has been found that an influence is asserted on a measurement accuracy of the electric conductivity of the lubricating liquid due to this sludge.

Specifically, elution occurs in the form of metal ions from metal powder that constitutes sludge generated by machining when the sludge is stored for a long time in the lubricating liquid, and the metal ion concentration within the lubricating liquid increases. It has been found that as the metal ion concentration increases, the electric conductivity changes (drifts) by the amount of the increase, and the electric conductivity and a solubility concentration of alkaline electrolytic water cannot be detected accurately.

Figure 10:
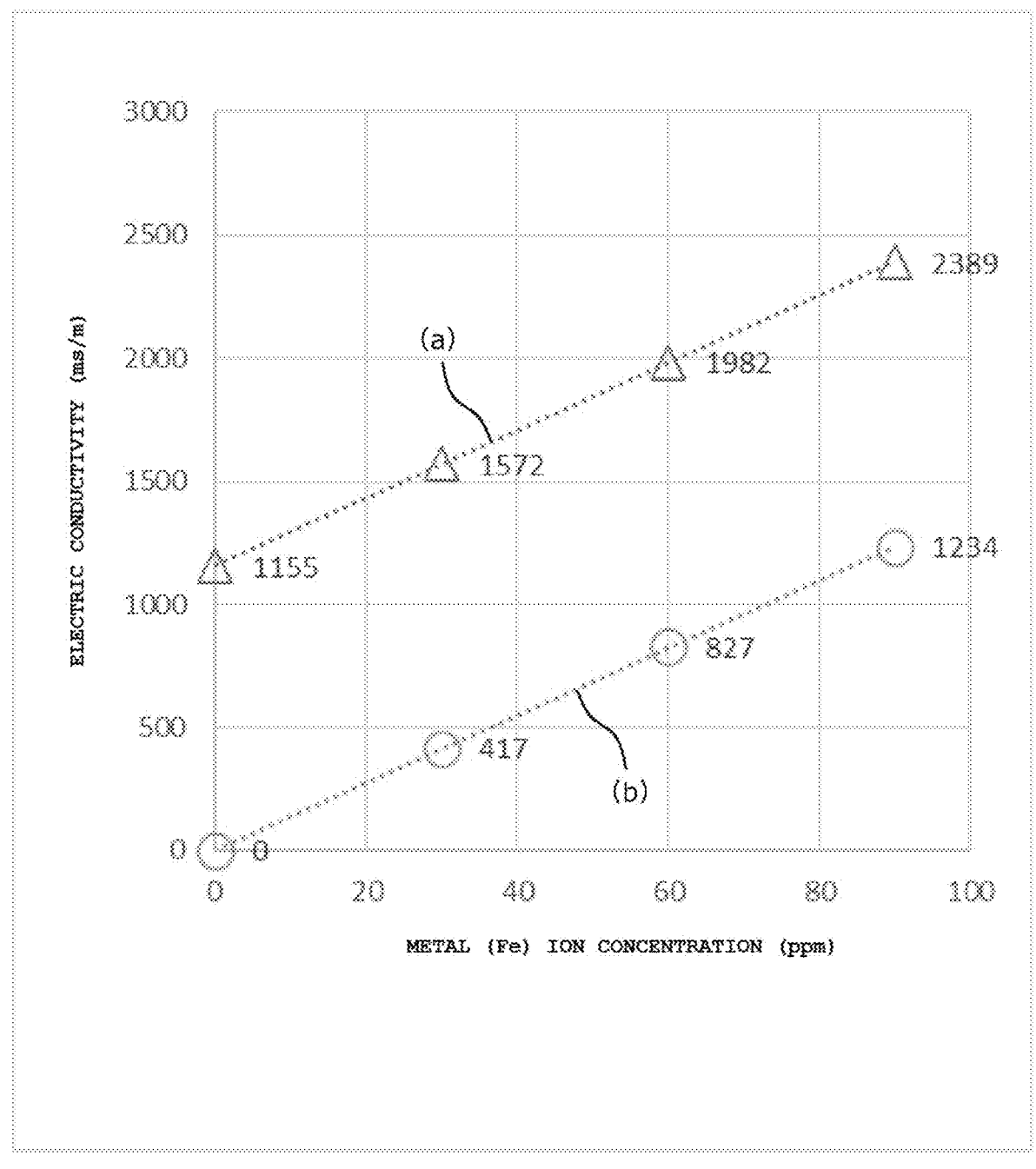
FIG. 10 is a graphic diagram showing a correlation between the electric conductivity of the lubricating liquid and a Fe ion concentration that assumes the case where Fe ions are dissolved in alkaline electrolytic water as the lubricating liquid.
Figure 11:
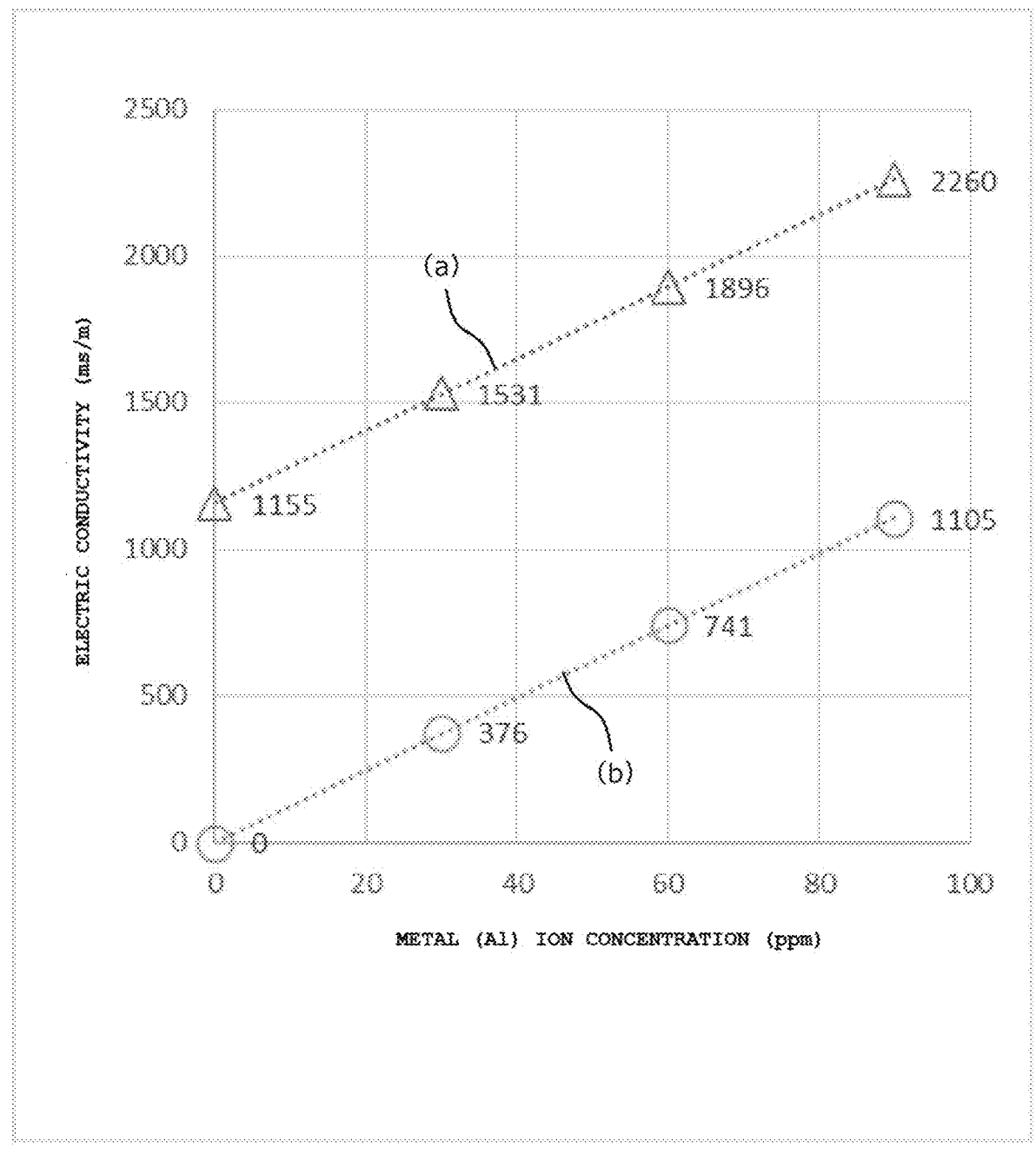
FIG. 11 is a graphic diagram showing a correlation between the electric conductivity of the lubricating liquid and an Al ion concentration that assumes the case where Al ions are dissolved in alkaline electrolytic water as the lubricating liquid.
Figure 12:
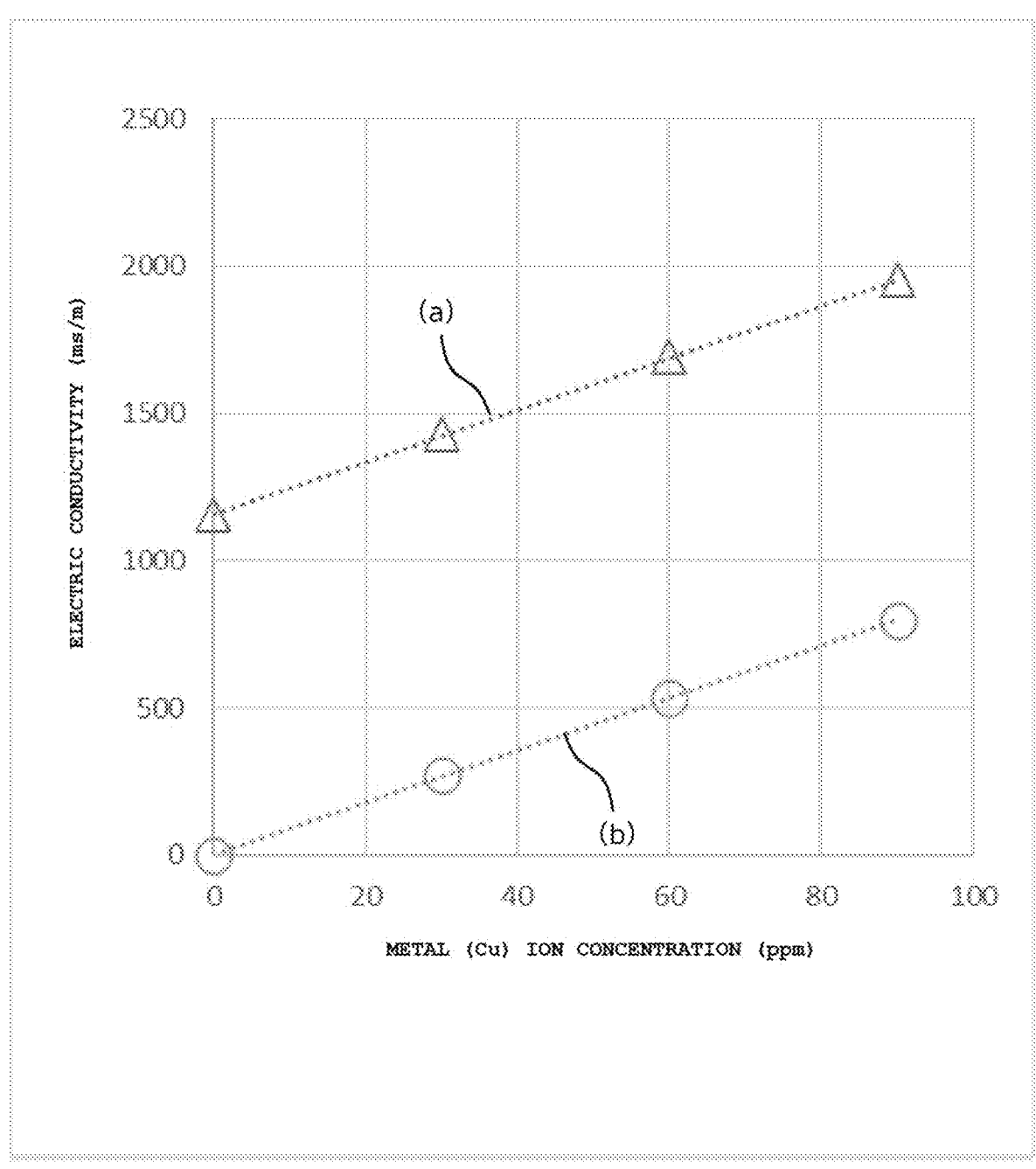
FIG. 12 is a graphic diagram showing a correlation between the electric conductivity of the lubricating liquid and a Cu ion concentration that assumes the case where Cu ions are dissolved in alkaline electrolytic water as the lubricating liquid.

Each of FIG. 10 to FIG. 12 is a graphic diagram showing an influence of an Fe ion concentration, an Al ion concentration, and a Cu ion concentration exerted on the electric conductivity of a lubricating liquid concentration (cutting liquid concentration) with alkaline electrolytic water as a base. In FIG. 10, a case is assumed in which Fe ions are dissolved in the alkaline electrolytic water as a lubricating liquid, in the upper stage (a), a measurement value (mS/m) of the electric conductivity of a solution for each concentration is plotted (triangular marks) with respect to a solution of four Fe ion concentrations (ppm) created by forcibly fixing various types of additive amounts of Fe ions with the lubricating liquid, and a correlation curve of the electric conductivity with respect to a Fe ion concentration is graphed from four plotted measurement values. Moreover, in the lower stag (b), a graphic diagram that excludes an influence of Fe ions is shown, a value (mS/m) is plotted (round marks) that subtracts the measurement value (leftmost triangular mark) of the electric conductivity of each solution that does not include Fe ions from the measurement value (ppm: triangular marks) of the electric conductivity in the solutions of four Fe ion concentrations (ppm) shown in the upper portion (a), and a correlation curve of an amount of change in the electric conductivity with respect to an amount of change in a Fe concentration is graphed from this plot.

Similarly, in FIG. 11 and FIG. 12, in the upper stage (a), a measurement value (mS/m) of the electric conductivity of a solution for each concentration is plotted (triangular marks) with respect to a solution of various additive amounts of an Al ion concentration and a Cu ion concentration (ppm), and a correlation curve of the electric conductivity with respect to an Al ion concentration and a Cu ion concentration is graphed from four plotted measurement values. Moreover, in the lower stage (b), a value (mS/m) is plotted (round marks) that subtracts the measurement value (leftmost triangular mark) of the electric conductivity of each solution that does not include Al ions and Cu ions from the measurement value (ppm: triangular marks) of the electric conductivity in the solutions of four Al ion concentrations and Cu ion concentrations shown in the upper stage (a), and a correlation curve of an amount of change in the electric conductivity with respect to an amount of change in an Al concentration and a Cu concentration is graphed from this plot. Note that, in the experiments shown in FIG. 10 to FIG. 12, a working liquid is used that dilutes PROGRESS S of SRT Co., Ltd. (oil-free cutting liquid: made of triethanolamine, synthetic lubricants, and a lubricant additive electrolyte solution) with alkaline electrolytic water.

Specifically, in the case where the additive amount of Fe ions to alkaline electrolytic water as shown in FIG. 10 is 0 (ppm (no addition)), 30 (ppm), 60 (ppm), or 90 (ppm), the measurement value of the electric conductivity is 1,155 (mS/m), 1,572 (mS/m), 1,982 (mS/m), and 2,389 (mS/m), respectively, and the correlation curve shown in the top stage (a) is shown. Moreover, a difference (correction amount) of the electric conductivity from the case where Fe ions are not added (the case of 0 (ppm)) is 0 (mS/m), 417 (mS/m), 827 (mS/m), and 1,234 (mS/m), respectively, and the correlation curve shown in the bottom stage (b) is shown.

Moreover, in the case where the additive amount (metal ion concentration) of Al ions to alkaline electrolytic water as shown in FIG. 11 is 0 (ppm (no addition)), 30 (ppm), 60 (ppm), or 90 (ppm), the measurement value of the electric conductivity is 1,155 (mS/m), 1,531 (mS/m), 1,896 (mS/m), and 2,260 (mS/m), respectively, and the correlation curve shown in the top stage (a) is shown. Moreover, a difference (correctio amount) of the electric conductivity from the case where Al ions are not added (the case of 0 (ppm)) is 0 (mS/m), 376 (mS/m), 741 (mS/m), and 1,106 (mS/m), respectively, and the correlation curve shown in the bottom stage (b) is shown.

In addition, in the case where the additive amount (metal ion concentration) of Cu ions to alkaline electrolytic water as shown in FIG. 12 is 0 (ppm (no addition)), 30 (ppm), 60 (ppm), or 90 (ppm), the measurement value of electric conductivity is 1,155 (mS/m), 1,427 (mS/m), 1,689 (mS/m), and 1,951 (mS/m), respectively, and the correlation curve shown in the top stage (a) is shown. Moreover, a difference (correction amount) of the electric conductivity from the case where Cu ion are not added (the case of 0 (ppm)) is 0 (mS/m), 272 (mS/m), 534 (mS/m), and 796 (mS/m), respectively, and the correlation curve shown in the bottom stage (b) is shown.

From the above experimental results, in the case of any of Fe ions, Al ions, and Cu ions, it can be seen that a correlation curve of the electric conductivity in the case of the measurement values of the electric conductivity of the upper stage (a) and not adding metal ions of the lower stage (b) is roughly linear (linear). Therefore, if eluted metal ions to a lubricating liquid by a tool or workpiece of the machine tool can be assumed, it is understood that an electric conductivity not receiving an influence of metal ions can be calculated, by using the correlation curve (linear line) of an amount of change in the electric conductivity with respect to a change of various eluted metal ion concentrations such as shown in the lower stage (b) of FIG. 10 to FIG. 12 as a calibration curve.

First, a correlation (correlation curve) between various metal ion concentrations and the electric conductivity such as in the lower stage (b) of FIG. 10 to FIG. 12 is set as a calibration curve. Next, the electric conductivity of alkaline electrolytic water as a lubricating liquid and the metal ion concentration of an eluted metal are measured, by means for detecting a prescribed metal ion concentration (described below) while actually executing a machining process by the machine tool, and the electric conductivity of a lubricating liquid in which an eluted metal is not included can be calculated, by calculating an amount of influence (correction amount) on the electric conductivity in accordance with the metal ion concentration measured from the calibration curve, and performing a correction to subtract the calculated amount of influence from the electric conductivity of the measurement values. In this way, the quality of a lubricating liquid can be managed with high accuracy by setting the electric conductivity as an index. Note that, the calibration curves such as on the bottom stage (b) of FIG. 10 to FIG. 12 for correcting a displacement amount (amount of influence on the electric conductivity) of the electric conductivity due to the eluted metal ion concentration is set in application software built into the quality management system for a machining process, and when the electric conductivity of the lubricating liquid is measured, a corresponding calibration curve is called out each time, and a correction of the electric conductivity is executed.

Note that, the above described metal ion concentration is measured roughly by the following derivation methods.

(i) Cyclic voltammetry that can simultaneously derive a plurality of metal ion concentrations by measuring a metal ion specific potential.

(ii) Atomic absorption spectrometry in which a concentration measurement becomes possible by measuring the absorbance of specific metal ions.

(iii) An ICP-AES (Inductively Coupled Plasma-Atomic Emission Spectroscopy) method that can simultaneously measure the concentrations of a plurality of metal ions by performing spectroscopic analysis of the metal ions.

Hereinafter, the above described process of correcting the electric conductivity will be described.

First, STEP 1 to STEP 3 for measuring and setting beforehand a metal ion concentration in alkaline electrolytic water and an influence on the electric conductivity will be described.

Specifically, for a prescribed metal ion from among metal ions assumed to be eluted within the lubricating liquid in a long time process, the electric conductivity (mS/m) for a prescribed metal ion concentration (ppm) is measured at multiple points (STEP 1), and a correlation curve (linear line) between the metal ion concentration (ppm) and the electric conductivity (mS/m) from multiple points is set as a calibration curve (STEP 2). Since it can be seen that this correlation curve has a positive correlation (a linear function in the examples of FIG. 10 to FIG. 12), a linear function of the metal ion concentration (ppm) and the electric conductivity (mS/m) is stored as a calibration curve (STEP 3). The pro esses of STEP 1 to STEP 3 are each executed for a plurality of assumed metal ions by a machine tool, a tool, or a workpiece, and a calibration curve of the electric conductivity for the plurality of metal ions is calculated and set (STEP 4).

Next, STEP 4 to STEP 9, which correct an actual measurement value of the electric conductivity, will be described for a lubricating liquid actually used in the quality management system for a machining process.

First, the electric conductivity of a lubricating liquid (alkaline electrolytic water) actually machined for a long time is measured (STEP 4), and a prescribed metal ion concentration (ppm) dissolved in the lubricating liquid is measured (STEP 5). An amount of increase in the electric conductivity from the calibration curve set in STEP 3 with respect to the electric conductivity that receives an influence with respect to the metal ion concentration (ppm) measured in STEP 5 is set as a "correction value" (STEP 7). Note that, for the concentration measured metal ions in STEP 5, while a case is assumed in which a plurality of metal ions from a machine tool, a tool, or a workpiece are dissolved in the lubricating liquid, each metal ion concentration derived by a deriving method of the metal ion concentration is classified, and a combined correction value calculated in STEP 7 in accordance with the metal ion concentration is set as a "correction value" by providing a weighting to each metal ion (STEP 7').

Next, the "correction value" of the electric conductivity set in STEP 7 (and STEP 7') is subtracted from the actual value of the electric conductivity in STEP 4, and a true electric conductivity that does not receive an influence of metal ions dissolved by sludge or the like is calculated (STEP 8). Next, the calculated true electric conductivity is converted into a solute concentration (wt %) (STEP 9).

Note that, the processes of STEP 4 to STEP 9 have a condition of an actual management concentration region in which the electric conductivity has a positive correlation with the metal ion concentration (solubility concentration)

as described with reference to FIG. 8A (a solubility concern ration of 2 to 25 wt % in the example of FIG. 8A), and in the quality management system for the machining process and a lubricating liquid (alkaline electrolytic water) for a machine tool used for this quality management system, while it is generally not problematic because the lubricating liquid is used in an practical management concentration and a lubricating liquid is considered to be within the range of a practical management concentration region under normal use, it is more preferable to perform a determination of whether or not it is within the range of a practical management concentration region.

Heretofore, while embodiments of the quality management system of a machining process, the lubricating liquid for a machine tool, and the alkaline electrolytic water generation device for lubricating liquid generation of the present invention have been described, the embodiments shown in the specification and drawings of the present invention are merely examples, the present invention is not limited to these, and other various improvement examples and modifications present from the thoughts and teachings of the present claims would be obvious for a person skilled in the art.

REFERENCE SIGNS LIST

100, 200, 300, 400, 500, 600 quality management system for machining process
102, 202, 302, 402, 502, 602 machine tool
104, 204, 304, 404, 504, 604 electric conductivity monitoring device (electric conductivity meter)
106, 206, 306, 406, 506 working liquid storage tank (cutting liquid tank)
108, 208, 308, 408, 508, 608 alkaline electrolytic water generation device
110, 210, 310, 410, 510, 610 lubricating stock liquid storage tank
316, 516 mixing portion

The invention claimed is:

1. A quality management system for a machining process in the machining process of a machine tool in which a mixed liquid of a water-soluble lubricating stock liquid including alkaline electrolytic water and externally replenished alkaline electrolytic water is used as a lubricating liquid, wherein the quality management system monitors and manages a quality of the lubricating liquid after mixing by an electric conductivity, wherein the electric conductivity monitored in the lubricating liquid after mixing is corrected based on a preset correlation of a change in the electric conductivity with respect to an assumed metal ion concentration of the lubricating liquid by a prescribed eluted metal within the lubricating liquid in the machining process of the machine tool.

2. The quality management system for the machining process according to claim 1, wherein the electric conductivity monitored in the lubricating liquid is corrected by:

measuring the electric conductivity of the lubricating liquid of the mixed liquid and the metal ion concentration of the prescribed eluted metal, calculating an amount of change in the electric conductivity of the lubricating liquid by the prescribed eluted metal in the measured metal ion concentration from the preset correlation of the change in the electric conductivity with respect to the metal ion concentration of the lubricating liquid by the prescribed eluted metal, and subtracting the calculated amount of change in the electric conductivity from a measurement value of the measured electric conductivity.

3. The quality management system for the machining process according to claim 2, wherein the machine tool comprises a working liquid storage tank for collecting and storing the lubricating liquid and supplying the lubricating liquid to the machine tool as a working liquid, and the working liquid storage tank is supplied with the lubricating stock liquid from a lubricating stock liquid storage tank or a supply pipe connected to the lubricating stock liquid storage tank, and is supplied with the alkaline electrolytic water from an alkaline electrolytic water generation device, a storage tank of the alkaline electrolytic water generation device, or a supply pipe connected to the storage tank of the alkaline electrolytic water generation device, and the electric conductivity of the mixed liquid within the working liquid storage tank is monitored and managed.

4. The quality management system for the machining process according to claim 3, wherein the machine tool comprises a mixing portion for mixing the lubricating stock liquid supplied from the lubricating stock liquid storage tank or the supply pipe connected to the lubricating stock liquid storage tank and the alkaline electrolytic water supplied from the alkaline electrolytic water generation device, the storage tank of the alkaline electrolytic water generation device, or the supply pipe connected to the storage tank of the alkaline electrolytic water generation device, and a mixed liquid of the lubricating stock liquid and the alkaline electrolytic water by the mixing portion is supplied to the working liquid storage tank.

5. The quality management system for the machining process according to claim 1, wherein the machine tool comprises a mixing portion for mixing the lubricating stock liquid supplied from a lubricating stock liquid storage tank or a supply pipe connected to the lubricating stock liquid storage tank and the alkaline electrolytic water supplied from an alkaline electrolytic water generation device, a storage tank of the alkaline electrolytic water generation device, or the supply pipe connected to the storage tank of the alkaline electrolytic water generation device, and a mixed liquid of the lubricating stock liquid and the alkaline electrolytic water within the mixing portion is supplied to within the machine tool from a supply pipe connected to the mixing portion, and the electric conductivity of the mixed liquid within the supply pipe connected to the mixing portion or within the mixing portion is monitored and managed.

6. The quality management system for the machining process according to claim 3, further comprising:

an electric conductivity meter for monitoring and managing the electric conductivity, wherein a necessary amount and a discharge amount per time of the lubricating stock liquid and/or the alkaline electrolytic water are set in accordance with whether or not the electric conductivity of the mixed liquid of the alkaline electrolytic water and the lubricating stock liquid measured from measurement information from the electric conductivity meter are within a preset range.

7. The quality management system for the machining process according to claim 6, wherein a plurality of the machine tools is present, the lubricating stock liquid and the alkaline electrolytic water of each of the plurality of machine tools are collectively supplied to one of the working liquid storage tank and the mixing portion, each of the plurality of machine tools comprises an electric conductivity meter for measuring the electric conductivity of the collected mixed liquid within the working liquid storage tank or within the mixing portion in accordance with each of the machine tools, a wired or wireless external monitoring device manages measured measurement information of each of the electric conductivity meters, determines whether or not the electric conductivity of the mixed liquid of the alkaline electrolytic water and the lubricating stock liquid is within a preset range in accordance with each of the machine tools, and sets a necessary amount and an automatic drip amount per time of the lubricating stock liquid and/or the alkaline electrolytic water.

8. The quality management system for the machining process according to claim 1, wherein the machine tool executes one or more of lathing, milling, grinding, hole drilling, saw cutting, water-jetting, electric discharging, pressing, grinding, and polishing.

9. The quality management system for the machining process according to claim 1, wherein a metal ion concentration and one or more of a sugar content, a concentration, and a pH of the lubricating stock liquid, the alkaline electrolytic water, or the mixed liquid are monitored and managed in addition to monitoring and managing the electric conductivity of the mixed liquid of the lubricating stock liquid and the alkaline electrolytic water.

10. The quality management system for the machining process according to claim 3, wherein a water level of the mixed liquid within the working liquid storage tank is monitored and managed in addition to monitoring and managing the electric conductivity of the mixed liquid of the lubricating stock liquid and the alkaline electrolytic water.

11. A lubricating liquid for the machine tool used in the quality management system for the machining process according to claim 1, wherein the lubricating liquid has the alkaline electrolytic water as a main component and does not include an oil-soluble material, and wherein the lubricating liquid is blended with a pH buffer that does not contain antiseptic agents.

12. The lubricating liquid for the machine tool according to claim 11, wherein a solute concentration of the lubricating liquid for the machine tool with the alkaline electrolytic water as the main component is set as a practical management concentration within a preset range in accordance with the machine tool and the machining process using the lubricating liquid.

13. An alkaline electrolytic water generation device for lubricating liquid generation that generates externally replenishable alkaline electrolytic water supplied as the lubricating liquid for the machining process of the machine tool according to claim 1, wherein the alkaline electrolytic water generation device for lubricating liquid generation is configured to:

monitor an electric conductivity of the generated alkaline electrolytic water in which a discharge portion of the generated alkaline electrolytic water is connected to the mixing portion, a working liquid storage tank, and a storage tank of the alkaline electrolytic water, or a supply pipe connected to each of the mixing portion, the working liquid storage tank, and the storage tank of the alkaline electrolytic water, and enable presetting or resetting of the electric conductivity of the alkaline electrolytic water generated in accordance with the machining process executed in the machine tool.

* * * * *